United States Patent
Yamada et al.

(10) Patent No.: US 7,619,377 B2
(45) Date of Patent: Nov. 17, 2009

(54) LINEAR MOTOR SYSTEM

(75) Inventors: Kenji Yamada, Kitakyushu (JP);
Akihiko Maemura, Kitakyushu (JP);
Shinya Morimoto, Kitakyushu (JP);
Toru Shikayama, Kitakyushu (JP);
Yoshiyuki Tanaka, Kitakyushu (JP);
Mamoru Takaki, Kitakyushu (JP)

(73) Assignee: Kabushiki Kaisha Yaskawa Denki, Fukuoka (JP)

( * ) Notice: Subject to any disclaimer, the term of this patent is extended or adjusted under 35 U.S.C. 154(b) by 343 days.

(21) Appl. No.: 11/664,420

(22) PCT Filed: Sep. 28, 2005

(86) PCT No.: PCT/JP2005/017858

§ 371 (c)(1),
(2), (4) Date: Apr. 2, 2007

(87) PCT Pub. No.: WO2006/038510

PCT Pub. Date: Apr. 13, 2006

(65) Prior Publication Data

US 2008/0106155 A1   May 8, 2008

(30) Foreign Application Priority Data

Oct. 1, 2004   (JP)   ............... 2004-289677
Nov. 15, 2004  (JP)   ............... 2004-330362

(51) Int. Cl.
   *H02P 25/06*   (2006.01)
   *H02K 41/02*   (2006.01)
(52) U.S. Cl. ........................ 318/135; 310/12
(58) Field of Classification Search ......... 318/135; 310/12
   See application file for complete search history.

(56) References Cited

U.S. PATENT DOCUMENTS 3,575,650 A * 4/1971 Fengler ............ 318/135
3,706,922 A * 12/1972 Inagaki ............ 318/135
3,719,869 A * 3/1973 Coho ............... 318/135

(Continued)

FOREIGN PATENT DOCUMENTS

JP   58-054862 A   3/1983

(Continued)

*Primary Examiner*—Burton Mullins
(74) *Attorney, Agent, or Firm*—Sughrue Mion, PLLC

(57) ABSTRACT

A linear motor system that can extend the stroke of a linear motor, with power saving and at a low cost, is provided.

In a linear motor system, constituted by a linear motor 100, a controller 7 for supplying a variable voltage, a winding switching device 6, for opening and closing phase windings 5 of individual phases that form a plurality of winding groups 4 that are separated in a stroke direction, the winding switching device 6 is constituted by a three-phase rectifying member, a semiconductor switch, which is located at both ends on the direct-current output side of the three-phase rectifying member, and a resistor and a capacitor, connected in parallel to the semiconductor switch. For each of the phase windings, which form the plurality of winding groups 4, separated in the stroke direction, one end is connected to the output end of the controller 7 and the other end is connected to an alternating-current input side of the three-phase rectifying member of the winding switching device 6. And by opening or closing the semiconductor switch included in the winding switching device 6, of the plurality of winding groups 4 separated in the stroke direction, only a desired winding group 4 is excited.

12 Claims, 17 Drawing Sheets

U.S. PATENT DOCUMENTS

| | | | |
|---|---|---|---|
| 4,595,870 A * | 6/1986 | Chitayat | 318/687 |
| 4,675,582 A * | 6/1987 | Hommes et al. | 318/38 |
| 5,136,217 A * | 8/1992 | Hoffmann et al. | 318/135 |
| 6,876,896 B1 * | 4/2005 | Ortiz et al. | 700/112 |

FOREIGN PATENT DOCUMENTS

| | | |
|---|---|---|
| JP | 03-045147 A | 2/1991 |
| JP | 03-045157 A | 2/1991 |
| JP | 2000-224833 A | 8/2000 |
| JP | 2001-078420 A | 3/2001 |
| JP | 2001-119916 A | 4/2001 |
| WO | WO 2004/021376 A1 | 3/2004 |

* cited by examiner

US 7,619,377 B2

LINEAR MOTOR SYSTEM

TECHNICAL FIELD

The present invention relates to a linear motor system that extends the stroke of a linear motor, with energy savings and at a low cost, and relates in particular to a long-stroke linear motor system that includes a winding switching device therefor.

Further, the present invention relates to a fixed armature type linear motor wherein the stator side is formed of a linear motor stator and an armature winding, and the moving element side is formed of a set of permanent magnets and a secondary conductor.

BACKGROUND ART

A conventional linear motor system includes, as a moving element, permanent magnets that serve as magnetism loading means; and as a stator, windings that serve as electricity loading means. A plurality of windings are arranged in a stroke direction, and controllers are respectively provided for supplying a current to the windings and are connected to an interval switching device (see, for example, patent document 1).

The conventional linear motor system will now be described while referring to FIG. 14.

In FIG. 14, reference numeral 900 denotes a conventional linear motor system; 901, a moving element; 902, permanent magnets; 903, stators; 904, controllers; and 905, an interval switching device. Windings that serve as electricity loading means are provided for the stators 903, which are respectively connected to the controllers 904. When the controllers 904 supply a current to the stators 903, thrust is generated between the stators 903 and the moving element 901, so that the moving element 901 is moved in the stroke direction. The interval switching device 905 is a device that employs positional information, relative to the moving element 901, obtained from specific means for measuring the position of the moving element 901, and provides a current supply instruction only for the controller 904 that is connected to the stator 903, which is located opposite the moving element 901 and contributes to the generation of a thrust.

As described above, according to the conventional linear motor system, of the controllers 904 connected to the stators 903, the internal switching device 905 issues an instruction to a controller 904 connected to a stator 903, which contributes to the generation of a thrust, so that a current is to be supplied only to a desired stator 903. Therefore, since a current does not flow to stators 903 that do not contribute to the generation of a thrust, generation loss is reduced and a longer stroke is obtained, with power saving.

However, for the above described conventional linear motor, to extend a stroke the stators 903 must be arranged across a distance equivalent to a desired stroke, and the same number of units as that of the stators 903 is also required for the controllers 904 to be connected to the stators 903. The controller 904 is generally expensive, and a problem exists with costs when the controller 904 is employed to extend a stroke.

Furthermore, the interval switch device 905, for issuing a current supply instruction to the controller 904, must obtain the exact position of the moving element 901 that moves in the stroke direction, and must provide a current supply instruction for a controller 904 that is connected to a stator 903 that faces the moving element 901 and that contributes to the generation of a thrust. Additionally, this instruction must include the magnitude, the phase and the frequency of a current. Therefore, there is a problem in that control of the interval switching device 905, relative to the controllers 904, is very complicated.

Further, for the conventional linear motor system 900, there is a difference in an induced voltage and the inductance between the state wherein the moving element 901 is positioned between the adjacent stators 903 and the state wherein the moving element 901 is positioned entirely opposite a stator 903. Therefore, as a problem, when the controller 904 supplies a current to the stator 903, the induced voltage and the inductance differ in accordance with the position of the moving element 901, relative to the stators 903, so that deterioration of the control performance and speed fluctuation occur.

Also, generally, linear motors are roughly classified into a moving armature type linear motor and a fixed armature type linear motor.

For a moving armature type linear motor, the stator side is constituted by permanent magnets and a secondary conductor, and the moving element side is constituted by armature windings (see, for example, patent document 2). In this case, a servo amplifier for driving a linear motor is connected to the moving element, and since, as well as for a rotary type motor, this arrangement can be handled as is a motor block, motor control of the moving armature type is easily exercised.

On the other hand, for a fixed armature type linear motor, the stator side is constituted by a linear motor stator and armature windings and the moving element side is constituted by permanent magnets and a secondary conductor (see, for example, patent document 3). In this case, a servo amplifier for driving a linear motor is connected to the stator side. As for the case involving a long stroke, a series connection of a plurality of armature windings and a parallel connection of a plurality of armature windings are proposed as arrangements for stator side armature windings. And in the case of a series connection, all the intervals, including an interval where a moving element does not overlap, are rendered conductive. While in the case of a parallel connection, switching between intervals is required for each block of armature windings, in accordance with a movement of the moving element.

As an interval switching method, there is a method whereby linear motor driving servo amplifiers, in a count equivalent to the number of stator blocks, are prepared, so that one servo amplifier controls one stator, and the servo amplifiers are switched, or a case wherein the control process is performed by one servo amplifier, or a small number of servo amplifiers, and an interval selection switch is provided separately, from the servo amplifiers, to exercise the control.

Patent Document 1: JP-A-3-45147 (fourth column, FIG. 5)
Patent Document 2: JP-A-2001-78420
Patent Document 3: JP-A-2000-224833

DISCLOSURE OF THE INVENTION

Problems to be Solved by the Invention

The shortcomings of the above described linear motors, of individual types, will be enumerated below.

In the moving armature type linear motor, a servo amplifier for driving a linear motor is connected to the moving element side, and since, as in a rotary type motor, the moving armature type is handled as a motor block, relative to the motor control aspect, this type is easy to control. However, since the moving armature side is to be rendered conductive, the wiring process for this can become a problem, and especially in order to obtain a long-stroke moving armature type linear motor, the wiring process is difficult. Furthermore, in the case of a linear synchronous motor, since permanent magnets are located on the stator side, many expensive permanent magnets must be employed to extend a stroke, to a degree, and the cost is comparatively high.

On the other hand, for the fixed armature linear motor, since a servo amplifier for driving a linear motor is connected to the stator side, the problem presented by the wiring process described above is eliminated. In the long stroke case, a series connection including a plurality of armature windings and a parallel connection of a plurality of armature windings are proposed as the arrangement for the stator side armature windings; however, in the series connection case, all the intervals, including an interval during which the moving element does not overlap, are rendered conductive, and this is improper for power consumption. Further, since the inductance leakage of the armature windings is increased, the power factor and the efficiency are reduced.

The system wherein armature windings in each stator block are connected in parallel and linear motor driving servo amplifiers are prepared, equivalent in count to the number of stator blocks, so that one servo amplifier controls one stator and the servo amplifiers are switched, is a complicated and expensive system.

In addition, there can be a case wherein control is exercised by one or a small number of servo amplifiers and an interval selection switch is provided, separate from the servo amplifiers, to exercise control. However, a problem, such as the discontinuation of a current or the pulsation of a torque, may occur due to a delay period for the switching operation.

The present invention is provided while taking these problems into account. One objective of the present invention is to provide a linear motor system that easily enables the extension of a stroke, at a low cost, without increasing the number of controllers, without requiring a complicated control process, even though employing the above described interval switching device, and without speed fluctuations.

Another objective of the present invention is to provide an inexpensive fixed armature type linear motor that resolves the problem with the wiring process, and that can switch a plurality of armature windings, efficiently and instantaneously, using a single servo amplifier.

Means for Solving the Problems

In order to resolve the above described problems, the invention relates to a linear motor system. There is provided a linear motor system, comprising:

a linear motor, wherein a moving element, which includes magnetic loading member formed of permanent magnets, and a stator, which includes magnetic loading member formed of windings having winding faces opposite the permanent magnets, are positioned opposite each other, separated by a gap, and wherein the stator is formed of a plurality of winding groups separated in a stroke direction, and phase windings of individual phases that form each winding group, to include a winding start terminal and a winding end terminal;

a controller, for supplying a variable voltage having a variable frequency to the linear motor; and a winding switching device, for closing or opening, as needed, the phase windings for the individual phases that form the plurality of winding groups separated in the stroke direction, wherein the winding switching device includes;

a three-phase rectifying member, a semiconductor switch located on both direct-current output sides of the three-phase rectifying member, and a resistor and a capacitor connected in parallel to the semiconductor switch, one end of each of the phase windings, which form the plurality of winding groups separated in the stroke direction, is connected to an output end of the controller, and the other end is connected to an alternating-current input side of the three-phase rectifying member of the winding switching device, and the semiconductor switch included in the winding switching device is opened or closed to excite only a desired winding group of the plurality of winding groups separated in the stroke direction.

More specifically, there is provided the linear motor system according to claim 1, wherein for the winding groups that form the stator, at least a sensor, for detecting at least one moving element or more that is opposite, is provided in the stroke direction; and based on a signal from the sensor, the semiconductor switch of the winding switching device connected to a winding group, which is opposite the moving element, is closed.

More specifically when Lc denotes a length, in the stroke direction, of a winding group forming the stator, and Lml denotes a length of the moving element, in the stroke direction, determining Lc and Lml in order to establish the relationship $Lml = n \times Lc$ n: an integer of two or greater, and exciting only a winding group entirely opposite the moving element in the stroke direction.

More specifically when Lc denotes a length in the stroke direction of a winding group forming the stator, and Lms denotes a length of the moving element in the stroke direction, arranging, in the stroke direction, a plurality of moving elements for which the relationship $Lms = Lc/n$ n: an integer of two or greater is established, attaching the moving elements to a fixed plate at a moving element arrangement pitch Lmp to establish the relationship $Lmp = Lms \times (n+1)$, and exciting only winding groups that the moving elements are entirely opposite to in the stroke direction.

More specifically wherein the winding groups that serve as the electricity loading means, the detection sensor for detecting the moving element and a processing circuit for processing a sensor from the detection sensor are respectively mounted on substrates on which a pattern is formed; and a plurality of the substrates are coupled by connectors to form the stator.

Another aspect of the invention is a linear motor system, comprising:

a linear motor wherein a moving element, which includes magnetic loading member, formed of permanent magnets, and a stator, which includes magnetic loading member formed of windings having winding faces opposite the permanent magnets, are positioned opposite each other, across a gap, wherein the stator is formed of a plurality of winding groups separated in a stroke direction, and phase windings of individual phases, which form each winding group, include a winding start terminal and a winding end terminal, and wherein sensors, for detecting that the moving element is entirely opposite, are respectively provided for the windings in the stroke direction;

a controller, for supplying a variable voltage variable frequency; and a winding switching device that includes;

three-phase rectifying member, a semiconductor switch, located on both direct-current output sides of the three-phase rectifying member, and a resistor and a capacitor, arranged in parallel to the semiconductor switch, wherein the winding start terminal of each of the phase windings, which form the plurality of winding groups separated in the stroke direction, is connected to an output terminal of the controller, and the other end is connected to an alternating-current input side of the three-phase rectifying member, of the winding switching device, and the semiconductor switch included in the winding switching device is closed, to excite the plurality of winding groups separated in the stroke direction, when Lc denotes a length of each of the winding groups in the stroke direction, and Lm denotes a length of the moving element in the stroke direction, determining Lc and Lm to establish the relationship $$Lm = n \times Lc$$

n: 2 or 3; and providing, for each of the winding groups, a signal preparation circuit that employs a signal from a sensor prepared for a winding group and a signal from a sensor prepared for at least one of the winding groups adjacent to the winding group, and prepares a signal for opening and closing the winding switching device that is connected to the winding groups.

More specifically the signal preparation circuits output signals to always set n−1 winding groups in an excited state.

More specifically each of the signal preparation circuits is constituted by a logic circuit, for outputting a signal that is obtained by performing an AND process for a signal output by the sensor arranged for a winding group for which the signal preparation circuit is provided, and an inverted signal of a signal output by a sensor arranged for one of winding groups adjacent to the winding group.

More specifically each of the signal preparation circuits is constituted by a logical circuit, which employs, as an output signal, the results obtained by performing an AND process for a signal output by a sensor arranged for a winding group for which the signal preparation circuit is provided, and a signal that is obtained by performing an AND process for signals output by two sensors arranged for both winding groups adjacent to the winding group and by inverting the resultant signal.

Yet another aspect of the present invention relates to a linear motor system. There is provided a linear motor system, wherein a plurality of stator blocks, each of which includes a linear motor stator and armature windings having a plurality of phases, are arranged linearly, and wherein an armature element side is constituted by a set of permanent magnets and a secondary conductor, comprises:

a winding switching circuit, wherein one terminal of each of the armature windings in each of the plurality of stator blocks is connected to each phase line of one linear motor driving servo amplifier, and the other terminal of the armature winding is connected to a middle point of a diode bridge having a plurality of phases, a semiconductor switch device is connected between a positive common terminal and a negative common terminal of the diode bridge, a series circuit, formed of a first reflux diode, a discharge resistor and a second reflux diode, is connected in parallel to the semiconductor switch, and a smoothing capacitor is connected in parallel to the discharge resistor, and when the semiconductor switch is sequentially turned on or off, based on a position signal from a moving element position sensor that is arranged on the linear motor stator side, the armature windings having a plurality of phases are switched between an excited state and an unexcited state.

According to the invention, in a case wherein the semiconductor switch is on, the positive common terminal and the negative common terminal of the diode bridge are short circuited. Thus, a drive current is supplied by the servo motor to the individual phases of the armature windings of the pertinent stator block, the linear motor stator is excited, and a moving force is exerted on the moving element. In a case wherein the semiconductor switch is turned off, the positive common terminal and the negative common terminal of the diode bridge are open, and thus, a drive current from the servo motor is not supplied to the armature windings of the pertinent stator block. However, energy accumulated in the armature windings is absorbed by the smoothing capacitor via the diode of the diode bridge and the first and second reflux diodes, and the energy accumulated by the smoothing capacitor is discharged through the discharge resistor.

When the same number of winding switching circuits as the plurality of stator blocks are provided, the stator blocks need only be sequentially switched to drive the moving element in a predetermined direction.

Furthermore, when the moving element position sensor generates a drive signal for the semiconductor switch device to sequentially switch the plurality of stator blocks, the moving element can be moved in a predetermined direction.

EFFECTS OF THE INVENTION

According to the invention, the semiconductor switch that constitutes the winding switching device is open or closed, and when it is closed, a winding group connected to the winding switching device is set to a state wherein it is connected as a star connection to the controller. Thus, as the controller supplies a current, the current flows to the winding group, so that the winding group is excited. Further, when the semiconductor switch is open, the neutral point side of the star connection is in the open state, and even when a current is supplied by the controller, the current does not flow through the winding group, so that the winding group can not be excited. Therefore, by opening or closing the semiconductor switch of the winding switch device that is connected to one of a plurality of winding groups separated in the direction of thrust, only a desired winding group can be excited. The thrust is generated at the winding group of the stator that is opposite the permanent magnet provided for the stator.

Since this linear motor system can excite only a desired winding group, the system can reduce loss to merely the loss that is generated in a winding group where a thrust is generated when the stroke is extended. Thus, a saving in energy can be realized.

Furthermore, the controller requires only the capacity to supply a generated thrust and the only loss is caused by the winding group where the thrust is generated, and in this linear motor system, the generated loss can be reduced. Therefore, when the stroke is extended, the capacity of the controller still need not be increased, and a cost reduction can be realized.

Further, since the stator is formed by arranging a plurality of winding groups in the stroke direction, a desired number of stators can be arranged, and when many stators are arranged, one controller can still operate them, and the extension of a stroke can be easily obtained.

More specifically, a signal from a sensor, which detects that the moving element provided for a winding group is opposite the winding group, is employed, and when the sensor detects the moving element, only a winding group that constitutes a stator opposite the moving element can be automatically excited. Since means for measuring the position of the moving element and for determining a winding switching device to be attached to a winding group to be excited is not required, simplification of the system and a reduction in the cost can be realized.

More specifically, since the length of the moving element in the stroke direction is at least twice that of a winding group, or greater, at least one winding group enters the state where it is entirely opposite the moving element, and only the winding group entirely opposite the moving element is excited.

All of the winding groups that constitute the stator are connected in parallel to the controller that supplies a variable voltage variable frequency. When the winding groups are excited in a state where they are not entirely opposite the moving element, because the size of the area facing the moving element differs, a difference would occur in the induced voltage generated in the individual winding groups, and a cyclic current would flow and cause a reduction in a generated thrust. However, since only a winding group that is entirely opposite the moving element is excited, the occurrence of a cyclic current can be eliminated.

More specifically, in the case, for example, of two moving elements to be attached to a fixed plate, one of the moving elements is in a state wherein it is located at the border of winding groups in the stroke direction, and is extended across two winding groups, i.e., is not entirely opposite a winding group, while the other moving element is in a state wherein it is entirely opposite a winding group. Therefore, at least one moving element is entirely opposite a winding group, and when only a winding group entirely opposite the moving element is excited, the occurrence of a cyclic current can be eliminated, and the sequential operation in the stroke direction can be performed.

More specifically, the winding groups that constitute the stator can be easily manufactured by arranging coils on a substrate and electrically connecting them, and a sensor for detecting the presence/absence of the moving element and a signal processing circuit therefor can also be easily manufactured by mounting devices on the substrate.

Further, since the stator can be easily produced by connecting the winding groups by using a connector, a reduction in the cost can be anticipated.

More specifically, the semiconductor switch that constitutes the winding switching device is open or closed, and when it is closed, a winding group connected to the winding switching device is set to the state wherein it is connected, as a star connection, to the controller. Thus, as the controller supplies a current, the current flows through the winding group, so that the winding group is excited. Further, when the semiconductor switch is open, the neutral point side of the star connection is in the open state, and even when a current is supplied by the controller, the current does not flow through the winding group, so that the winding group is not excited.

The length Lm of the moving element in the stroke direction is n times (n is 2 or 3) the length Lc in the stroke direction of the winding group that constitutes the stator. Based on the positional relationship of the moving element and the stator in the stroke direction, n or n−1 winding groups are entirely opposite the moving element in the stroke direction.

The signal preparation circuit prepares a signal to open or close the winding switching device that is connected to a winding group for which the signal preparation circuit is provided. Based on the sensor signal for a winding group where the signal preparation circuit is provided, and a sensor signal for a winding group adjacent to the winding group, the winding switching device connected to the winding group can be open or closed. As a result, while taking into account the positional relationship between the adjacent winding groups and the moving element, the winding switch device connected to a winding group where the signal preparation circuit is provided can be open or closed.

More specifically, in a case wherein the n or n−1 winding groups are entirely opposite the moving element, based on the positional relationship between the moving element and the stator in the stroke direction, when n winding groups are opposite, the signal preparation circuit can open only a winding switching device that is connected to only one desired winding group, and can enter a state wherein only n−1 windings are constantly excited. Therefore, the induced voltage and the inductance of the stator and the impedance of the resistor, viewed from the controller, can always be constant. Thus, the control performance can be improved and velocity fluctuation can be reduced.

More specifically, when the length Lm of the moving element in the stroke direction is twice (n=2) the length Lc of a winding group, in the stroke direction, that constitutes the stator, the signal preparation circuit can be provided by employing a very simple logic circuit using only a NOT device and an AND device.

More specifically, when the length Lm of the moving element in the stroke direction is three times (n=3) the length Lc of a winding group, in the stroke direction, that constitutes the stator, the signal preparation circuit can be provided by employing a very simple logic circuit using only a NOT device and an AND device.

According to the linear motor system of this invention wherein a winding switching circuit is provided, one servo amplifier controls a current that is to be supplied to the individual armature windings of a plurality of stator blocks, so that a fixed armature type linear motor having a long stroke can be provided at a low cost, and since a switching method using a semiconductor switch element is employed, the switching delay time can be minimized and smooth switching can be performed. As a result, a current flows continuously and torque pulsations are removed. Furthermore, since the armature windings of the linear motor stator are connected in parallel, the same impedance is always obtained for windings, except for the line resistance. Therefore, the servo amplifier can easily perform vector control, and the motor power factor and efficiency are increased.

DESCRIPTION OF REFERENCE NUMERALS AND SIGNS

Figure 1:
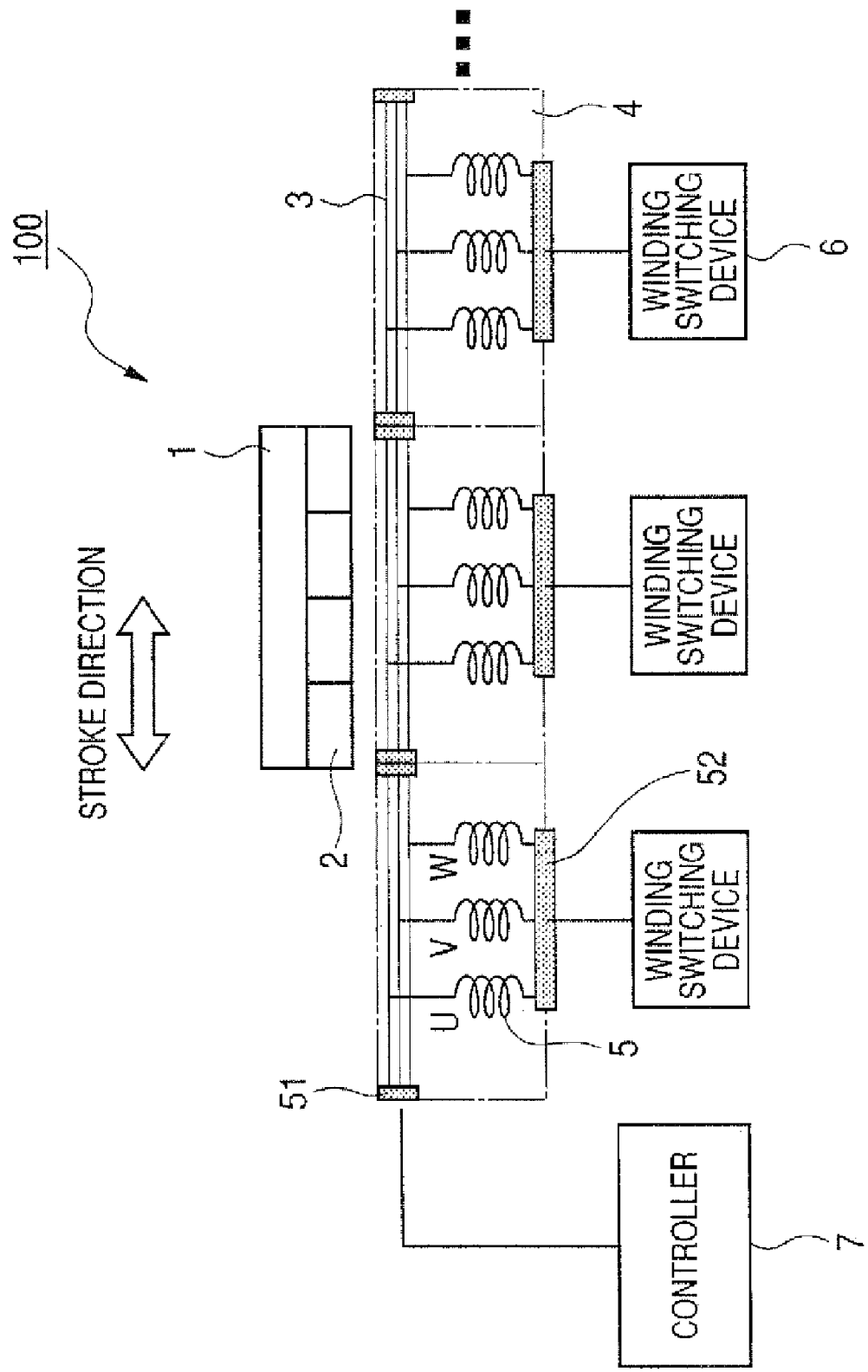
FIG. 1 is a configuration diagram of a linear motor system showing a first embodiment of the present invention.

1: moving element
2: permanent magnet
3: stator
4: winding group
5: winding
51: winding start
52: winding end
6: winding switching device
7: controller
8, 81, 82: sensor
9, 91: signal processing circuit
10: fixed plate
11, 12: moving element
13: substrate
14a, 14b, 14c, 14d: connector
15: coil
16: interval switching device
61, 181: three-phase rectifier
62, 162: semiconductor switch
63, 183: resistor
64, 184: capacitor
100: linear motor
110: moving element
120: permanent magnet
130: stator
140 (141 to 143): winding group
150: signal preparation circuit
161 to 168: connector
171, 172: sensor
180: winding switching device
190: controller
201: servo amplifier
202: stator block
203: linear motor moving element
204: selection switch portion
204-1: rectifying diode portion (diode bridge)
204-2: semiconductor switch device
204-3: reflux diode
204-4: smoothing capacitor
204-5: discharge resistor
205: drive circuit
206: selection signal processor
207: sensor unit

BEST MODES FOR CARRYING OUT THE INVENTION

The modes of the present invention will now be described while referring to drawings.

Embodiment 1

FIG. 1 is a configuration diagram of a linear motor system showing a first embodiment of the present invention.

Figure 2:
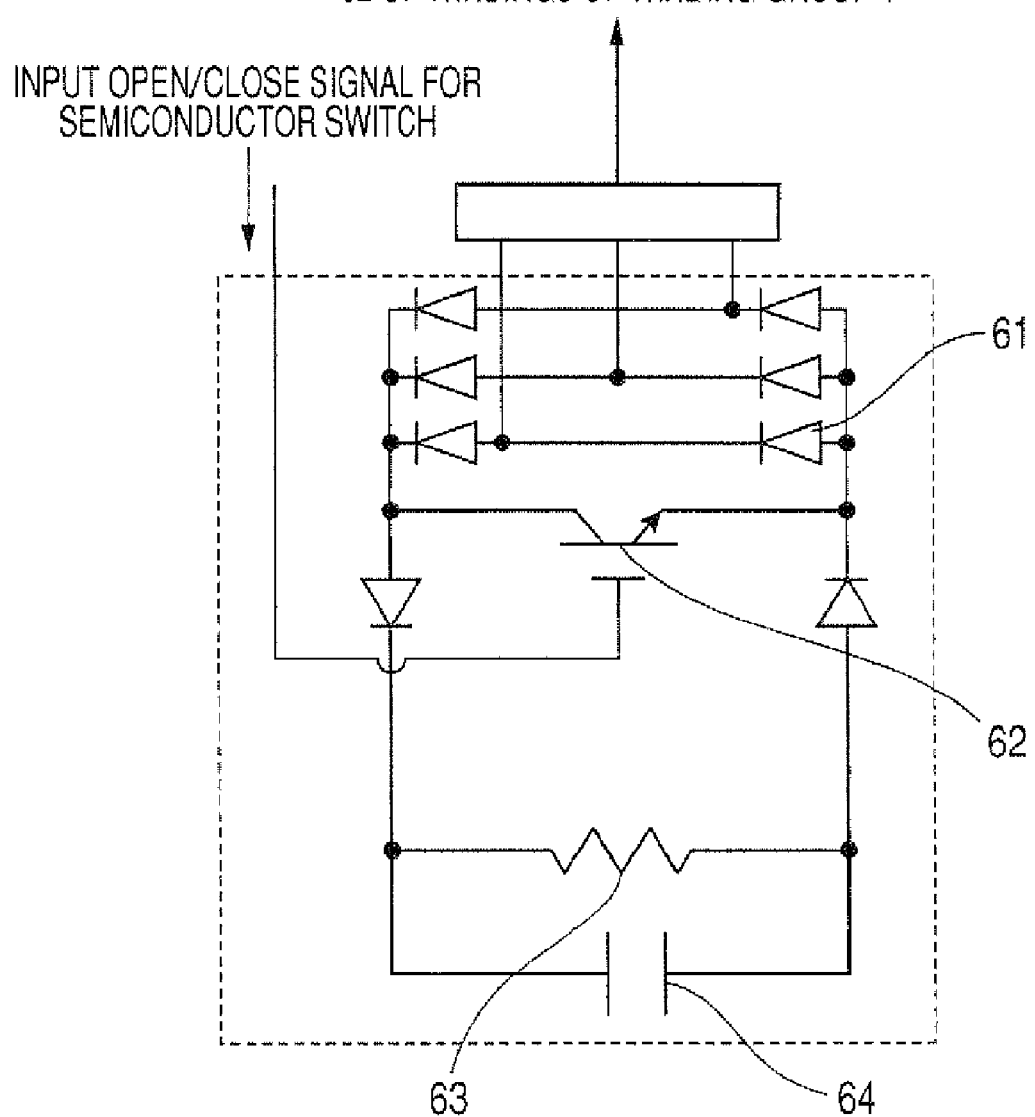
FIG. 2 is a circuit diagram for explaining a winding switching device for the present invention.

FIG. 2 is a diagram for explaining the configuration of a winding switching device in FIG. 1.

In FIG. 1, reference numeral 100 denotes a linear motor; 1, a moving element; 2, a permanent magnet; 3, a stator; 4, winding groups; 5, windings; 6, winding switching devices; and 7, a controller.

The moving element 1 is constituted by the adherence of the permanent magnets 2, in the stroke direction, so that their adjacent polarities differ. The stator 3 is constituted by arranging, in the stroke direction, a plurality of the winding groups 4, each formed of the windings 5 that have a U phase, a V phase and a W phase. The moving element 1 and the stator 3 are coupled together by a guide (not shown), and the moving element 1 can move freely, relative to the stator 3, in the stroke direction. For the windings 5 of the U phase, V phase and the W phase that form each winding group 4, their winding starts 51 are connected to the output terminal of the controller 7, and their winding ends 52 are connected, using connectors, to the input terminals of the winding switching devices 6.

As shown in FIG. 2, each winding switching device 6 is constituted by providing a three-phase rectifier 61, and by positioning a semiconductor switch 62 on both ends of the direct-current output side of the three-phase rectifier 61, and arranging a resistor 63 and a capacitor 64 parallel to the semiconductor switch 62. It should be noted that an IGBT is employed as the semiconductor switch 62.

A signal for opening and closing the semiconductor switch 62 is input to the semiconductor switches 62. A semiconductor switch 62 (FIG. 2) for a winding switching device 6 that is connected to a winding group 4 opposite the moving element 1 (FIG. 1) is closed, while a semiconductor switch 62 for a winding switching device 6 that is connected to a winding group 4 that is not opposite the moving element 1 is open.

When the semiconductor switch 62 is closed, a direct current, rectified by the three-phase rectifier 61, flows through the semiconductor switch 62, and the winding ends 52 of the U-phase, V-phase and W-phase windings 5 that form the winding group 4 connected to this semiconductor switch 62 are all connected.

Therefore, viewed from the winding starts 51 of the windings 5, the U-phase, V-phase and W-phase windings 5 are in a star connection state wherein the winding ends 52 are connected to a common point.

Thus, when a current is supplied by a variable frequency power source 7 to the winding group 4 that is connected to the winding switching device 6 whose semiconductor switch 62 is closed, a current flows through the U-phase, V-phase and W-phase windings 5, and a thrust force is generated between these windings 5 and the moving element 1, which is opposite the winding group 4 and on which the permanent magnets 2, which serve as magnetic loading means, are mounted.

When the moving element 1 is moved in the stroke direction and is shifted from the winding group 4 that is connected to the winding switching device 6 whose semiconductor switch 62 is closed, an open signal is input to the semiconductor switch 62, and the winding ends 52 of the U-phase, V-phase and W-phase windings 5 that form the winding group 4 are set to the open state. Thus, even when a current is supplied by the controller 7, the current does not flow across the windings 5, so that a thrust force is not generated.

The resistor 63 and the capacitor 64, which are connected in parallel to the semiconductor switch 62, constitute a snubber circuit, which consumes energy accumulated in the windings 5 when the semiconductor switch 62 is changed from closed to open.

With the above described arrangement, only a winding group 4 that is a constituent of the stator 3 and is opposite the moving element can be excited by the supply of a current. Therefore, viewed from the controller 7, a current must be supplied only to a winding group 4 required to generate a thrust force, and the operation can be very efficiently performed. And the capacity of the contact controller 7 must be determined based simply on the thrust and the loss at only the winding group 4 that is to be excited by the supply of a current, and only a small power source is required, which is very economical.

Further, according to the configuration shown in this embodiment, of the winding groups 4 that constitutes the stator 3, only a winding group 4 that is opposite the moving element 1 and generates a thrust force is excited by the supply of a current. Thus, the generation loss is consistent, regardless of the stroke, so that a desired number of winding groups 4 can be arranged in the stroke direction to form the stator 3.

It should be noted that, in this embodiment, since the semiconductor switch is constituted by using an IGBT element, the opening and closing operation can be performed in a very short period of time.

Embodiment 2

Figure 3:
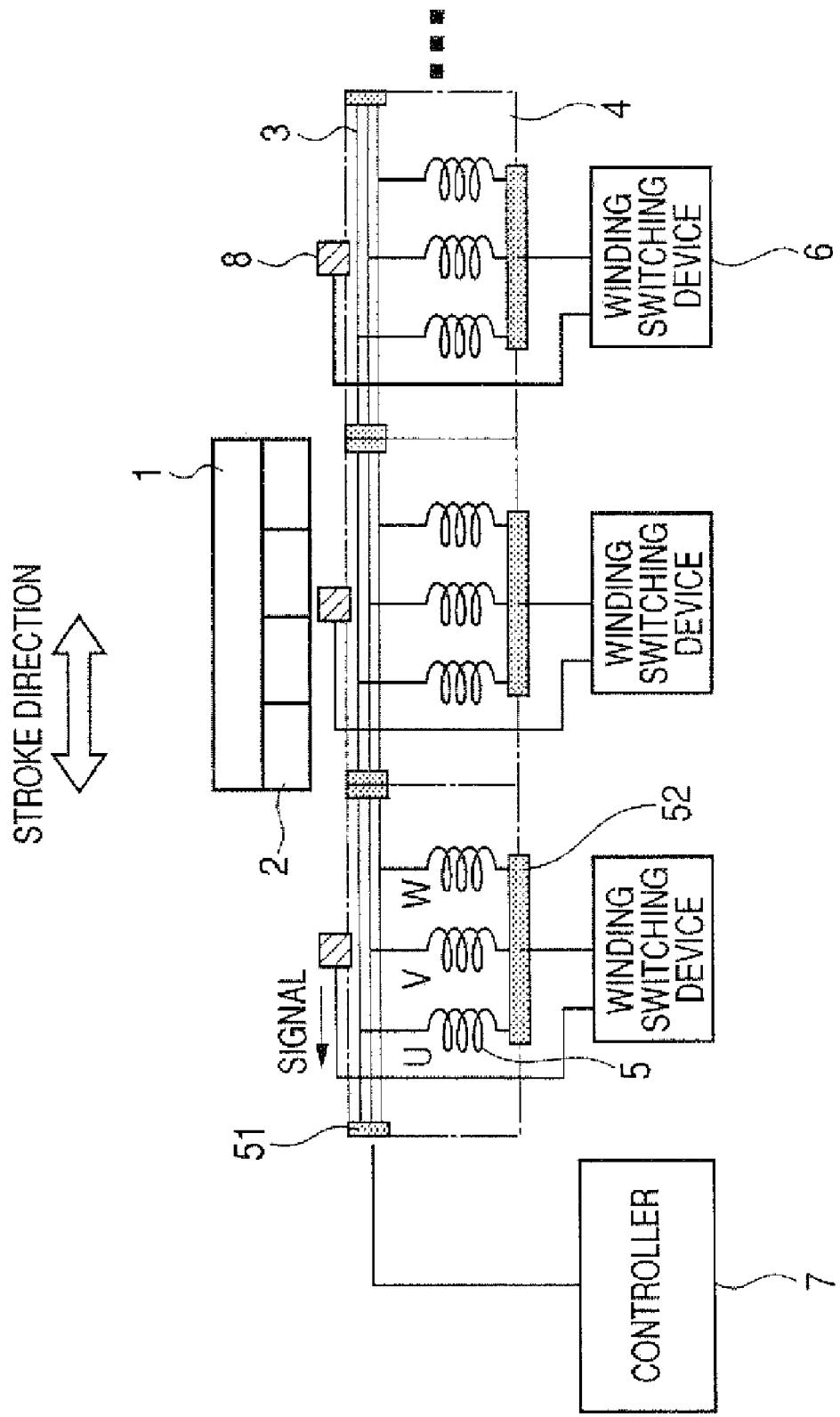
FIG. 3 is a configuration diagram of a linear motor system showing a second embodiment of the present invention.

FIG. 3 shows a second embodiment of the present invention.

In FIG. 3, reference numeral 8 denotes a sensor for detecting whether a moving element is positioned opposite.

For individual winding groups 4 that constitute a stator 3, the sensor 8 for detecting that a moving element 1 is opposite a winding group 4 is arranged on the faces directed toward the moving element 1. The output terminals of the sensors 8 are connected to the signal terminals, for opening and closing semiconductor switches 62, of winding switching devices 6 that are connected to the winding groups 4 where the sensors 8 are provided.

When a sensor 8 detects it is opposite the moving element 1, the sensor 8 transmits a close signal to the connected semiconductor switch 62. Upon receiving this signal, the semiconductor switch 62 is closed, and windings 5 of a winding group 4 that is connected to the winding switching device 6, where the semiconductor switch 62 is arranged, are excited by receiving a current from the controller 7.

When the moving element 1 is not opposite, the sensor 8 transmits an open signal to the connected semiconductor switch 62, and a current does not flow to the windings 5 of the winding group 4, connected to the winding switching device 6 where the semiconductor switch 62 is provided.

As described above, the sensor 8 detects that the moving element 1 is opposite, and based on this signal, the semiconductor switch 62 of the winding switching device 6 is held open or closed. Thus, when the moving element 1 is moved in the stroke direction, and the position of the moving element 1 relative to the stator 3 is changed, only a winding group 4 opposite the moving element 1 can be automatically excited by supplying a current.

Embodiment 3

Figure 4:
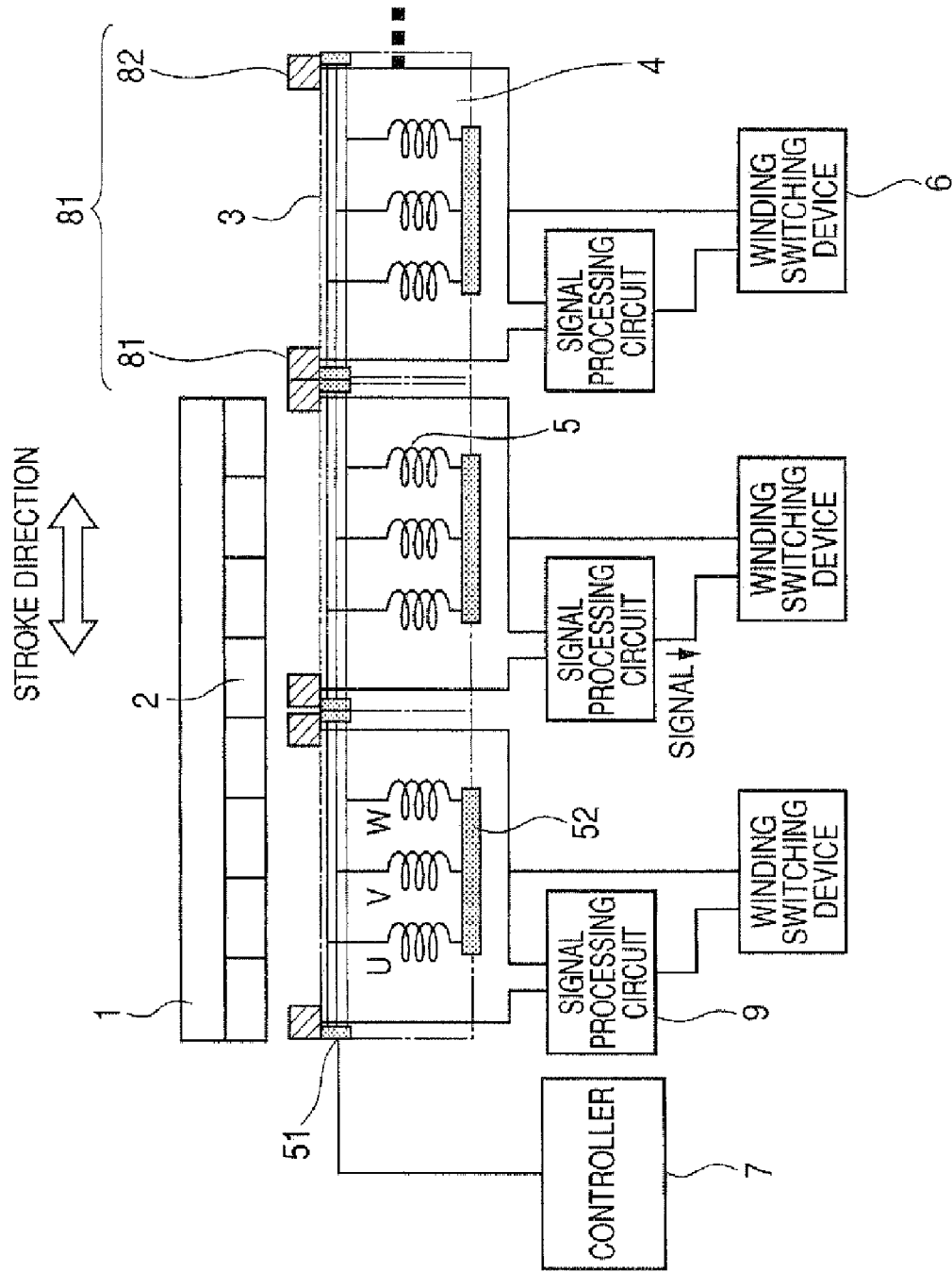
FIG. 4 is a configuration diagram of a linear motor system showing a third embodiment of the present invention.

FIG. 4 shows a third embodiment of the present invention. In FIG. 4, for a length Lml of a moving element 1 in the stroke direction and a length Lc, in the stroke direction, of a winding group 4 that constitutes a stator 3, the length relationship $Lml = n \times Lc$ n: an integer of 2 or greater is established. In this embodiment, n is 2, and the length Lc of the winding group 4 is defined as half the length Lml of the moving element 1 in the stroke direction.

On the face of each winding group 4 opposite the moving element 1, two sensors, 81 and 82, for detecting that the moving element 1 is opposite the winding group 4, are mounted at respective ends in the stroke direction. A signal processing circuit 9 is provided between the sensors 81 and 82 and a winding switch device 6 that receives signals from the sensors 81 and 82, so that, when both of the sensors 81 and 82, mounted at both ends in the stroke direction, detect that the moving element 1 is opposite, the sensors 81 and 82 transmit a close signal to a semiconductor switch 62 of the winding switching device 6.

With the above described arrangement, only when the moving element 1 is entirely opposite, in the stroke direction, to a winding group 4 that constitutes a stator 3, is the semiconductor switch 62 of the winding switching device 6 that is connected to the winding groups 4 closed, and is the winding group 4 excited by a current supplied by a variable frequency power source 7.

In this embodiment, all the winding groups 4 that constitute the stator 3 are connected in parallel to the variable frequency power source 7. According to the above described arrangement, since a winding group 4 to be excited is always exactly opposite, in the stroke direction, to a permanent magnet 2 that is provided for the moving element 1 to serve as magnetic loading means, the same induced voltage is generated by each winding group 4 that is excited. Thus, there is no generation of a brake torque that occurs due to a cyclic current that is caused by a difference in the induced voltage when the winding groups are connected in parallel to a power source.

Embodiment 4

Figure 5:
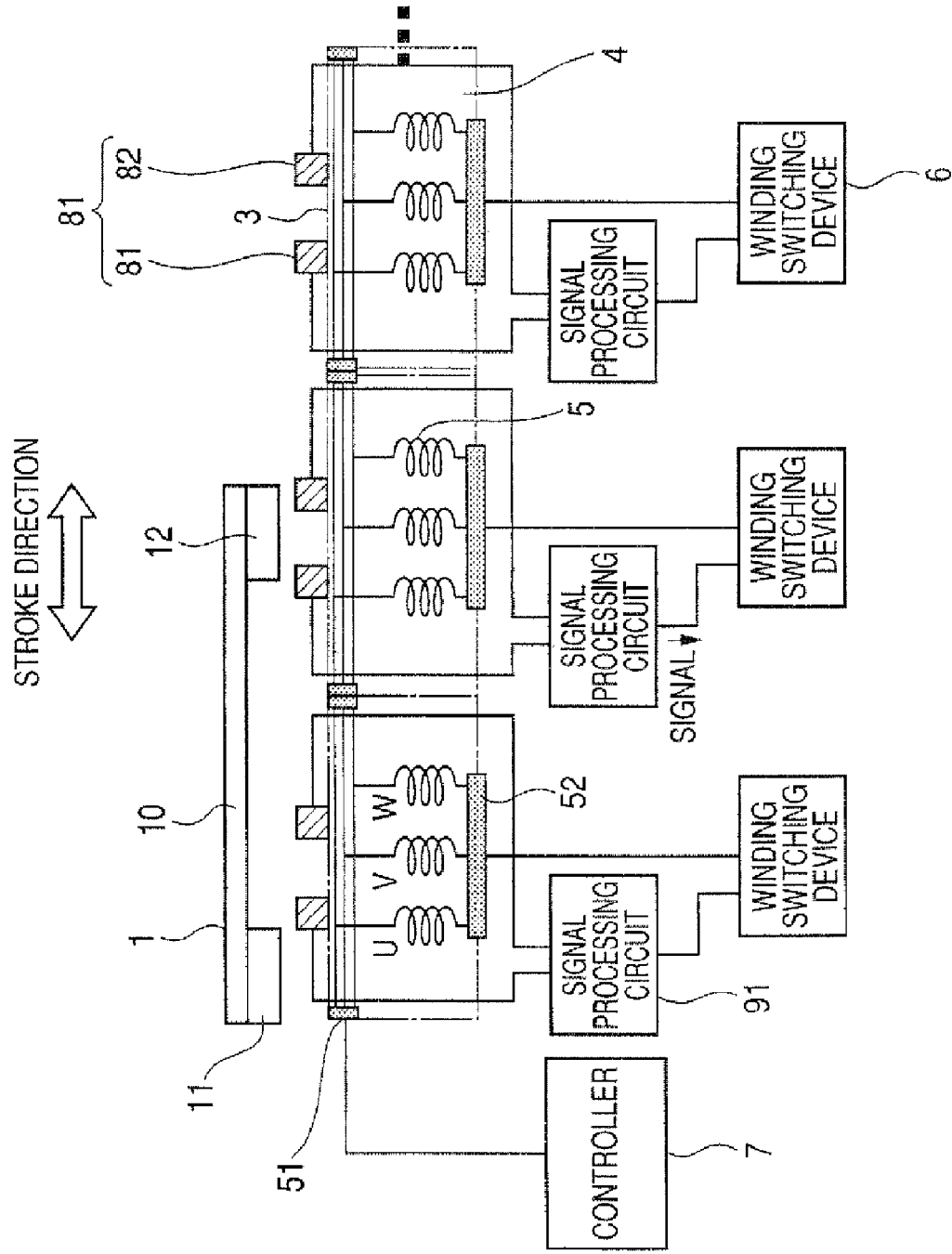
FIG. 5 is a configuration diagram of a linear motor system showing a fourth embodiment of the present invention.

A fourth embodiment of the present invention is shown in FIG. 5.

In FIG. 5, for a length Lc in a stroke direction, for winding groups 4 that constitute a stator 3, and a length Lms, for a moving element 11 or 12 in the stroke direction, the length relationship $Lms = Lc/n$ n: an integer of two or greater is established. In this embodiment, n=3 is employed. The two moving elements 11 and 12 that include permanent magnets 2 are securely arranged on a fixed plate 10 at a pitch Lmp of $Lmp = Lms \times (n+1)$.

Sensors 81 and 82, for detecting that the moving elements 11 and 12 are located opposite, are mounted on the faces of the winding groups 4 that constitute the stator 1 and are directed toward the moving elements 11 and 12, by employing, as a pitch, the distance Lms from both end faces of the winding group 4, in the stroke direction, to the moving element 1. Signal processing circuits 91 are provided between the sensors 81 and 82 and winding switching devices 6, which receive signals from the sensors 81 and 82, so that when at least one of the two sensors 81 and 82 attached at the two ends in the stroke direction detects that the moving element 11 or 12 is opposite, the sensor 81 or 82 transmits a close signal to a semiconductor switch 62 of the winding switching device 6.

With this arrangement, only in a state wherein the moving element 11 or 12 is exactly opposite the winding group 4 that constitutes the stator 1 is the semiconductor switch 62 of the winding switching device 6 closed and a current supplied by a controller 7, and a thrust generated by a magnetic flux that is generated by the permanent magnet 2 attached to the opposing moving element 11 or 12. In a state wherein the moving element 11 or 12 is located across adjacent winding groups 4 in the stroke direction, neither of the sensors 81 and 82 detect this, so that a current does not flow to the winding groups 4 and a thrust is not generated.

The moving elements 11 and 12 are arranged, in the stroke direction, at the pitch Lmp described above. Therefore, the interval between the moving elements 11 and 12 corresponds to the length Lc of a winding group in the stroke direction, and in FIG. 5, in the state wherein the moving element 12 is extended across the winding groups 4, one moving element 11 is always positioned opposite a winding group, not extended across winding groups 4, and supports the generation of a thrust.

According to the arrangement shown in the above described embodiment, all of the winding groups 4 that constitute the stator 3 are connected in parallel to the controller 7, and a current is supplied only when the moving element 11 or 12 is located opposite. Therefore, the same induced voltage is generated in a winding group 4 that is excited, and brake torque due to a cyclic current does not occur. Further, since the moving elements 11 and 12 are arranged at the above described pitch Lmp, a stator (the stator 11 in FIG. 5) and a winding group 4 where a thrust is generated always exist, and the thrust is not interrupted in the stroke direction.

Embodiment 5

Figure 6:
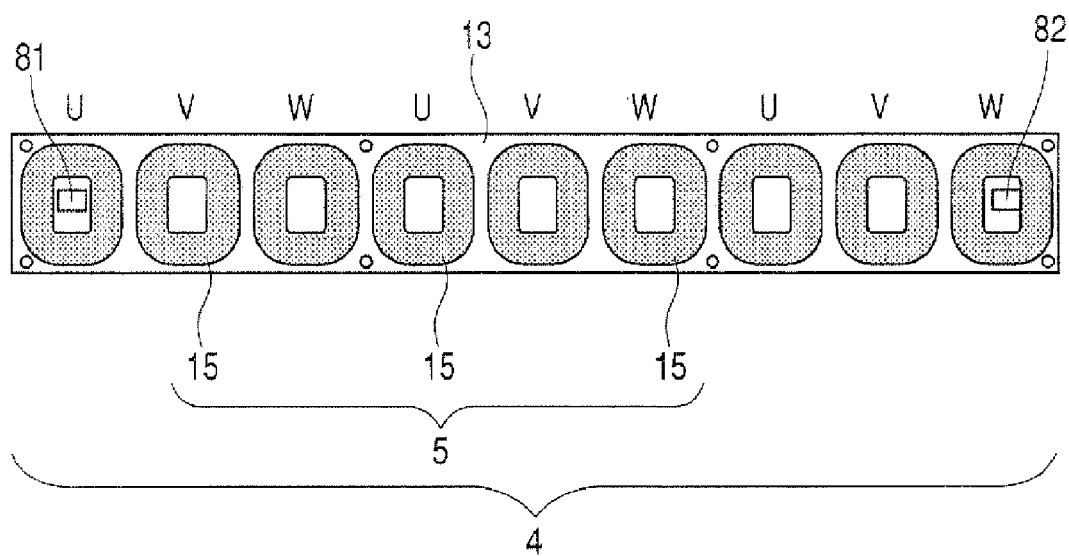
FIG. 6 is a front view of a winding group showing a fifth embodiment of the present invention.
Figure 7:
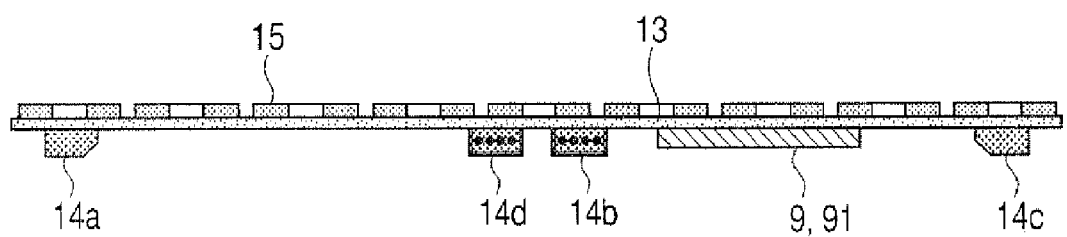
FIG. 7 is a side view of the winding group showing the fifth embodiment of the present invention.

A fifth embodiment of the present invention is shown in FIGS. 6 and 7.

FIG. 6 is a front view of winding groups 4 for the embodiment of the present invention, and FIG. 7 is a side view.

Since a moving element 1, a stator 3, a controller 7 and a winding switching device 6 are the same as those in embodiments 1 to 5 described above, they are not shown, and only the structure of the winding group 4 will be explained.

Figure 8:
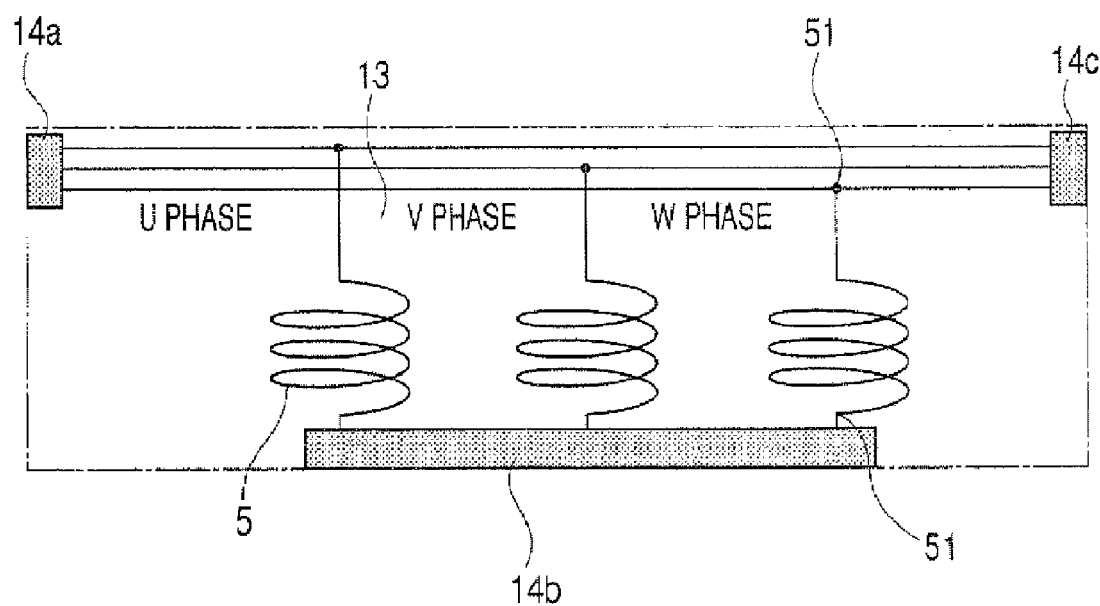
FIG. 8 is a side view of the winding group showing the fifth embodiment of the present invention.

In FIGS. 6 to 8, reference numeral 13 denotes a substrate on which a winding pattern is provided; reference numerals 14a, 14b, 14c, 14d denote connectors; and reference numeral 15 denotes a coil.

To constitute windings 5 of the winding groups 4, the coils 15 are spirally wound and are electrically connected, by soldering, to the substrate 13 where wiring is provided, and are secured to the substrate 13 using an adhesive.

FIG. 8 is a circuit diagram showing the winding group 4 that is formed by the wiring pattern, provided for the substrate 13, and the windings 5. Connectors 14a and 14b, which are electrically connected to winding starts 51 and winding ends 52 of the windings 5, are attached. Further, a pattern is provided for the substrate 13 to connect adjacent winding groups 4 in parallel to the controller 7, and a connector 14c is arranged at the terminal end.

The stator 3 is constituted by arranging, in the stroke direction, a plurality of the winding groups 4 that have the above described structure. The connector 14a of the winding group 4, which constitutes the stator 3 and is located at the end in the stroke direction, is connected to an output cable extended from the controller 7 using a connector, and the connector 14b located at the other end of the winding group 4 is connected to the connector 14a of the adjacent winding group 4. Thus, through a simple connector connection, the controller 7 and the winding groups 4, which constitute the stator 3, are connected in parallel.

Further, a land for mounting a sensor 8 and a pattern for transmitting a sensor signal are provided for the substrate 13. In addition, the signal processing circuits 9 and 91 in embodiments 4 and 5 are also provided for the substrate 13, and the outputs of the signal processing circuits 9 and 91 are connected to a winding switching device 6 using the connector 14d.

Embodiment 6

Figure 9:
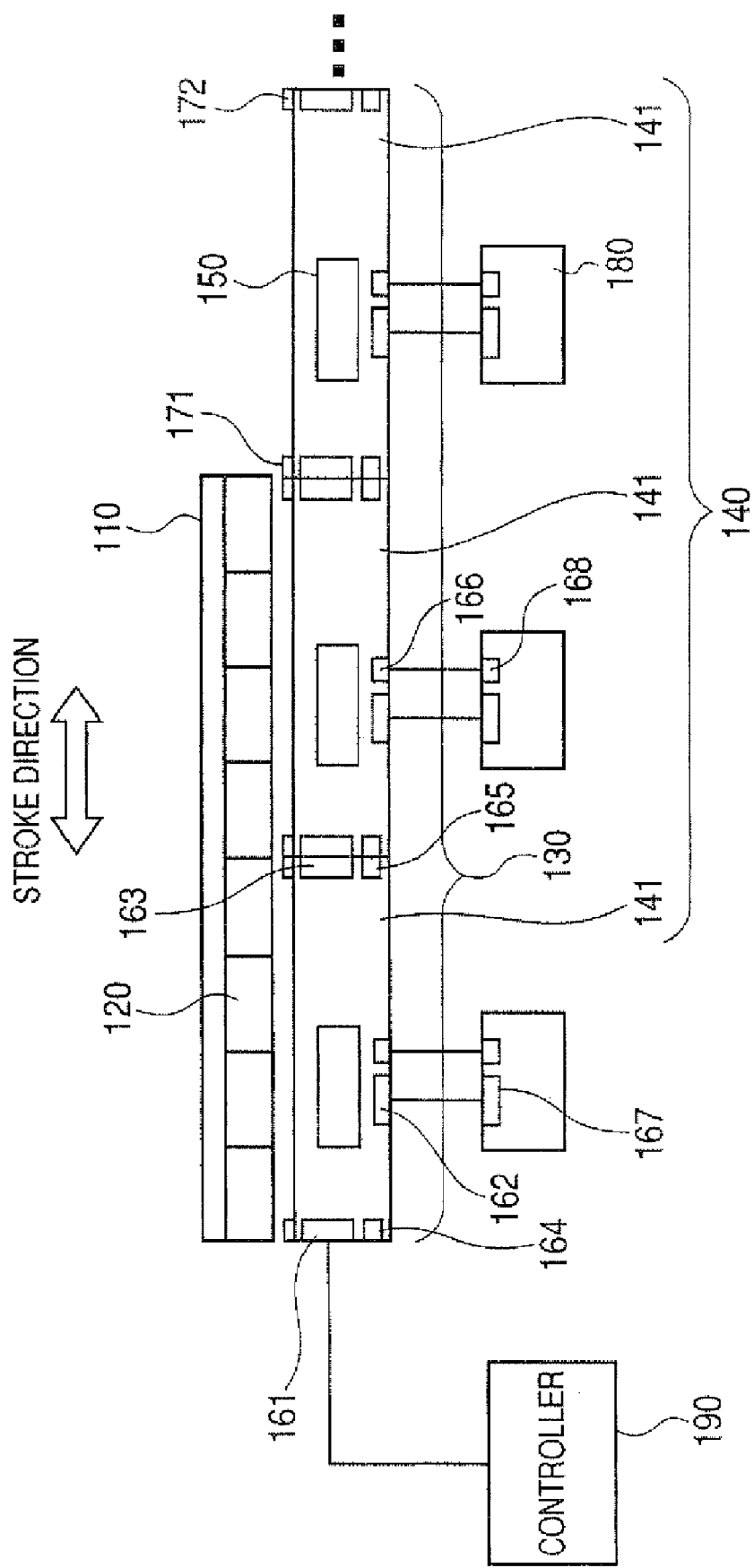
FIG. 9 is a configuration diagram of a winding selection linear motor system showing a sixth embodiment of the present invention.

FIG. 9 is a configuration diagram for a winding switching linear motor system according to a sixth embodiment. This is a case wherein a length Lm of a stator is twice (n=2) a length Lc of a winding group.

Figure 10:
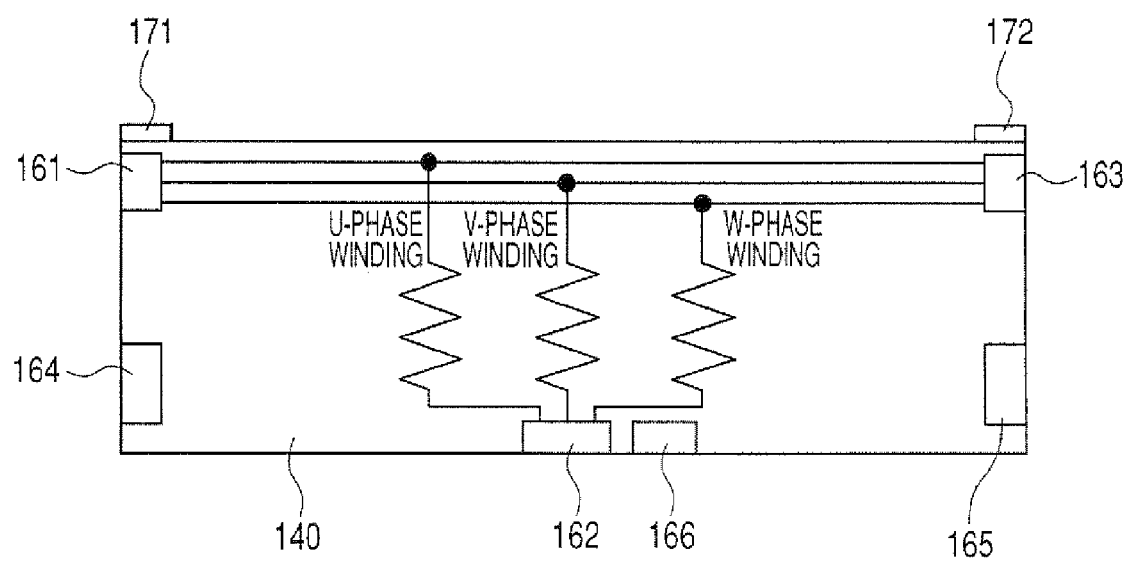
FIG. 10 is a circuit diagram for explaining a winding circuit for the present invention.
Figure 11:
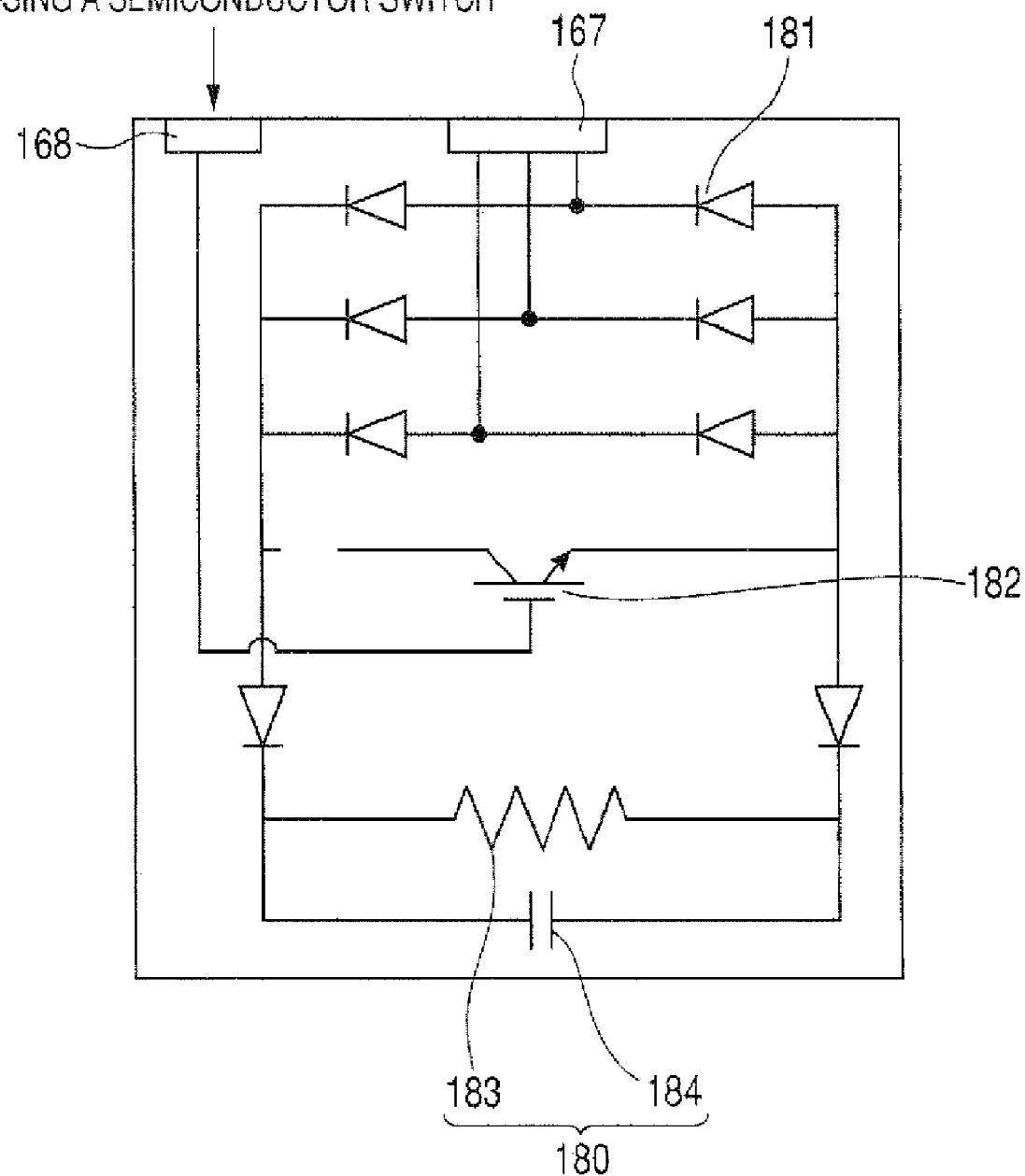
FIG. 11 is a circuit diagram for explaining a winding switching circuit for the present invention.
Figure 12:
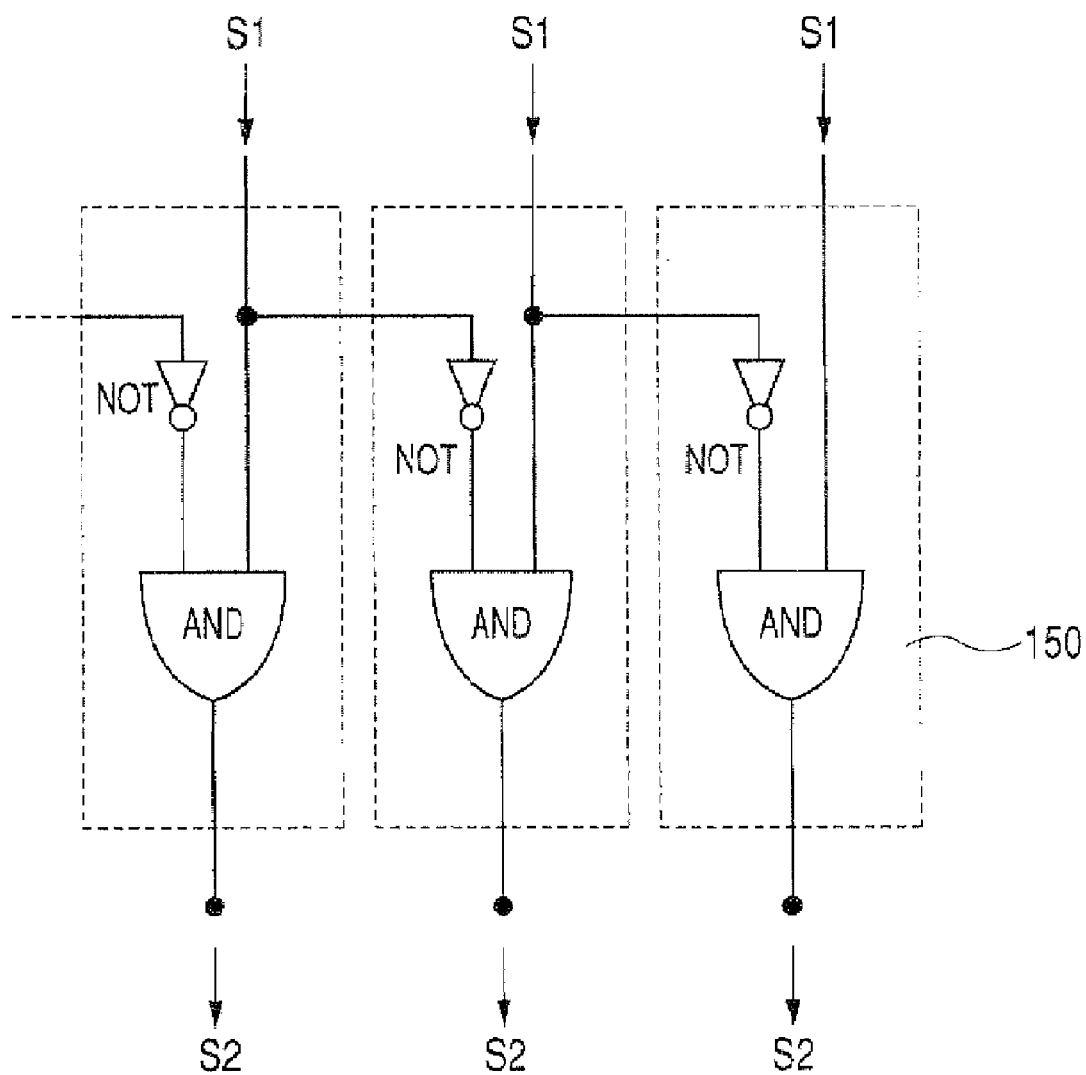
FIG. 12 is a logic circuit diagram, in a case where n=2, for explaining the signal processing of the present invention.
Figure 13:
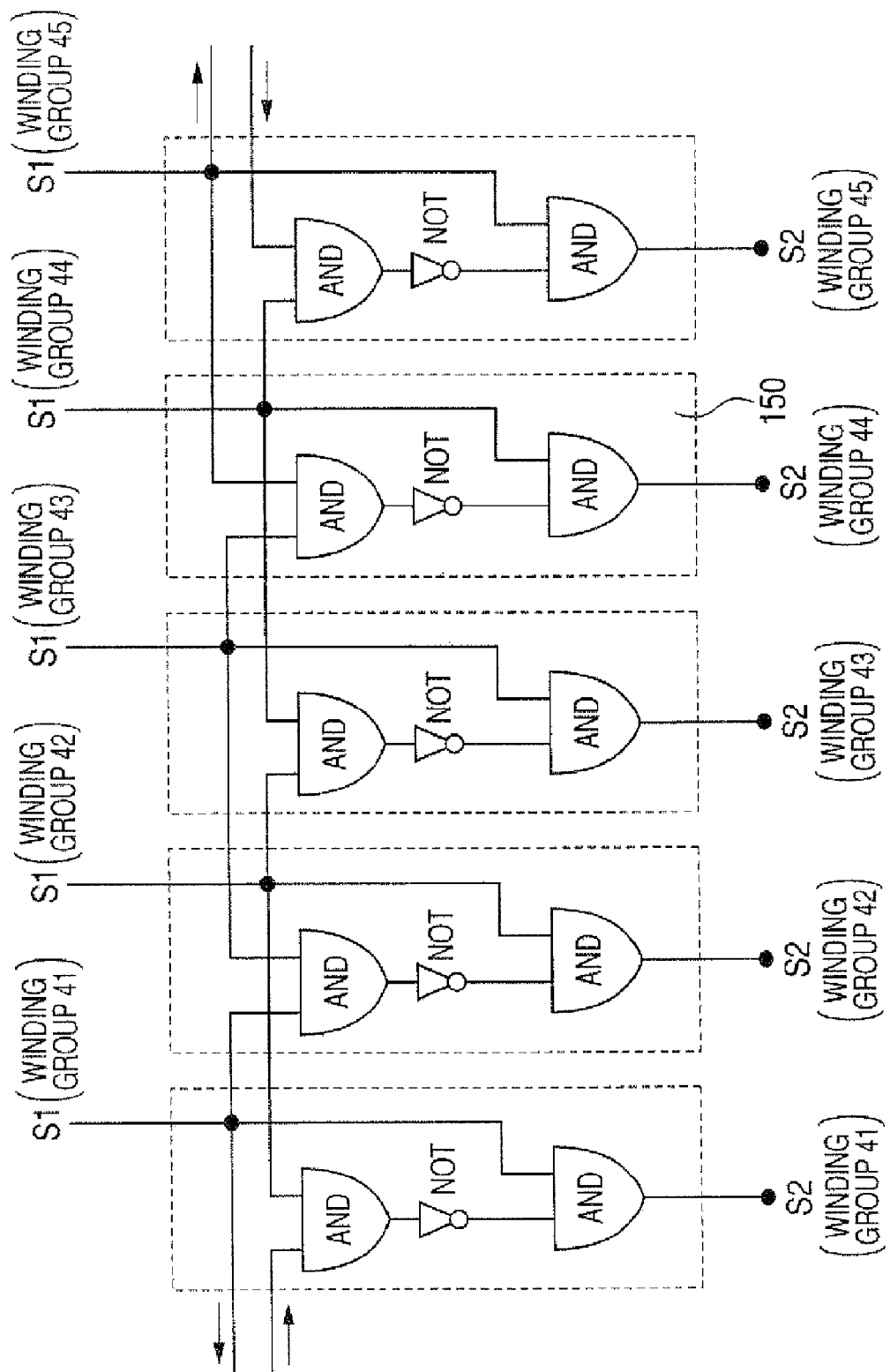
FIG. 13 is a logic circuit diagram, in a case where n=3, for explaining the signal processing of the present invention.
Figure 14:
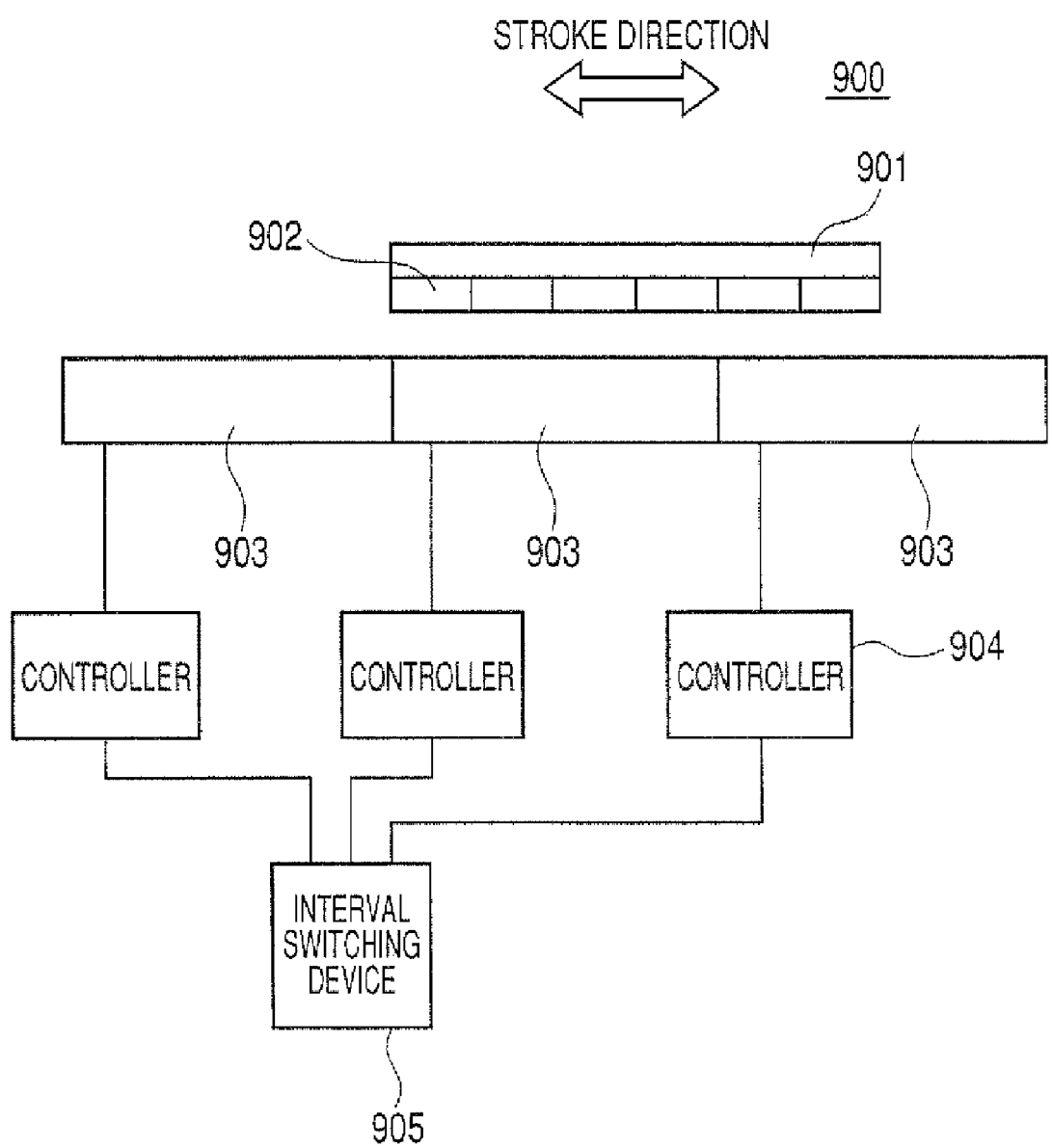
FIG. 14 is a configuration diagram of a conventional linear motor system.

FIG. 10 is a circuit diagram for a winding group, FIG. 11 is a diagram for explaining the arrangement of a winding switching device, and FIGS. 12 and 13 respectively show logic circuits in a signal preparation circuit.

In FIG. 9, reference numeral 110 denotes a moving element; 120, a permanent magnet; 130, a stator; 140 (141 to 43), winding groups; 150, a signal preparation circuit; 161 to 168, connectors; 171 and 172, sensors; 180, winding switching devices; and 190, a controller. It should be noted that the connectors 161, 162, 163 and 167 are those for transmitting U-phase, V-phase and W-phase power, and the connectors 164, 165, 166 and 168 are those for transmitting a signal.

The moving element 110 is constituted by the adherence of the permanent magnets 120, in the stroke direction, so that their adjacent polarities differ. The stator 130 is formed by arranging, in the stroke direction, a plurality of the winding groups 140 (141 to 143), each of which is formed of U-phase, V-phase and W-phase windings.

The moving element 110 and the stator 130 are coupled, using a guide (not shown), and the moving element 110 can move freely, relative to the stator 130, in the stroke direction.

As shown in FIG. 10, the connectors 161 and 162 are provided at the winding starts and winding ends of the U-phase, V-phase and W-phase windings that form the individual winding groups 141 to 143, and further, the connector 163 is located to be electrically connected to the connector 161.

For the connection of the controller 190 to the individual winding groups 141 to 143 and the winding switching devices 180, first, the connectors 163 of the individual winding groups 141 to 143 are electrically connected to the connectors 168 of the winding switching devices 180, then, the connector 161 of the winding group 141, which is located at the end of the stator 130, is electrically connected to the controller 190, and the electrical connection of the connector 162 to the connector 161 of the adjacent winding group is sequentially performed between the winding groups 141 and 142, and 142 and 143. As a result, the winding groups 140 (141 to 143) are connected in parallel to the controller 190 in the same manner as the winding switching devices 180 are arranged on the neutral point side.

Sensors 171 and 172 are located on the two ends of the winding group 140 in the stroke direction. The sensors 171 and 172 are used to detect that they are opposite the moving element 110, and only when both the sensors 171 and 172 detect the moving element 110 and transmit signals does a logic circuit (not shown), upon receiving the two signals, generate a signal S1 indicating that the moving element 110 is exactly opposite the winding group 140.

Signal preparation circuits 150 (FIG. 1) are provided for the winding groups 140. Each signal preparation circuit 150 is so constituted that it also accepts a signal S1 that is created based on detection signals transmitted by the adjacent sensors 171 and 172, of the winding groups 140, across the connectors 164 and 165, and transmits, as an open/close signal S2 to the winding switching device 180 across the connectors 167 and 169, the result obtained for the signal processing performed along the logic circuits in FIG. 12.

In this embodiment, since the relationship $$Lm = 2 \times Lc$$

is established for the length Lm of the moving element 110 and the length Lc of the winding group 140, as is shown in Table 1 there are three patterns for the signal S1 for the relative positional relationship in the stroke direction.

rectified by the three-phase rectifier 181 flows through the semiconductor switch 182, and the U-phase, V-phase and W-phase windings, which form the winding group 140 connected to the semiconductor switch 182, become a star connection where the neutral point side is electrically connected. Therefore, when a current is supplied by the controller 190 to a winding group 140 that is connected to a winding switching device 180 whose semiconductor switch 182 is closed, a current flows through the U-phase, V-phase and W-phase windings, and a thrust is generated between the windings and the moving element 110, which is opposite the winding group 140 and to which the permanent magnets 120 that serve as magnetic loading means are attached.

When a S2 signal indicating OFF, which is an open signal, is input to the semiconductor switch 182, the U phase, the V phase and the W phase that form the winding group 140 on the neutral point side are set to the open state, and even when a current is supplied by the controller 190, a current does not flow through the windings. Thus, a thrust is not generated.

It should be noted that the resistor 183 and the capacitor 184 that are connected in parallel to the semiconductor switch 182 constitute a snubber circuit, which is used to consume energy accumulated in windings when the semiconductor switch 182 is changed from closed to open.

TABLE 1

|  | Signal S1 | | | Signal S2 | | |
| --- | --- | --- | --- | --- | --- | --- |
|  | Winding group 41 | Winding group 42 | Winding group 43 | Winding group 41 | Winding group 42 | Winding group 43 |
| Pattern 1 | ON | ON | OFF | ON | OFF | OFF |
| Pattern 2 | OFF | ON | OFF | OFF | ON | OFF |
| Pattern 3 | OFF | OFF | ON | OFF | OFF | ON |

Since the logic circuit shown in FIG. 12 processes the three patterns for the signal S1 by also fetching information for the signals S1 of the adjacent winding groups 140, as the obtained result, only one signal S2 is always set to ON. Therefore, in a case wherein the signal S1 is transmitted, unchanged, to the winding switching devices 180, two or one winding switching device 180 is closed in accordance with the positional relationship of the stator 130 and the moving element 110. However, since the signal preparation circuits 150 are prepared, only one (a predetermined number of) winding switching device 180 is constantly closed, regardless of the positional relationship of the stator 130 and the moving element 110.

As shown in FIG. 11, the winding switching device 180 is constituted by a three-phase rectifier 181, a semiconductor switch 182, which is located on both ends on the direct-current output side of the three-phase rectifier 181, and a resistor 183 and capacitor 184, which are arranged in parallel to the semiconductor switch 182. It should be noted that an IGBT is employed for the semiconductor switch 182. A signal S2 for opening or closing the semiconductor switch 182 is input to the semiconductor switch 182, and when S2 is ON, the semiconductor switch 182 is closed. Then, a direct current With the above described arrangement, regardless of the position of the moving element relative to the stator, only the same number of winding groups can be set to the excited state, and the induced voltage and inductance viewed from the controller and the impedance of the resistor can also be constant. Thus, the control performance can be improved and thrust fluctuation can be reduced.

Further, among the winding groups that constitute the stator, only a winding group that is opposite the moving element and generates a thrust is excited by receiving a current, so that the generation loss is constant, regardless of a stroke. Therefore, when the stator is formed by arranging a desired number of winding groups in the stroke direction, generation loss will still not be increased, and an extension of the stroke can be easily performed.

Table 2 shows the patterns of the signal S1 when the length Lm of the moving element in the stroke direction is three times (n=3) the length Lc in the stroke direction of winding groups that constitute the stator. For convenience sake, for the explanation, winding groups are denoted by 141 to 145 in the table.

TABLE 2

|  | Signal S1 | | | | | Signal S2 | | | | |
| --- | --- | --- | --- | --- | --- | --- | --- | --- | --- | --- |
|  | Winding group 41 | Winding group 42 | Winding group 43 | Winding group 44 | Winding group 45 | Winding group 41 | Winding group 42 | Winding group 43 | Winding group 44 | Winding group 45 |
| Pattern 1 | OFF | ON | ON | ON | OFF | OFF | ON | OFF | ON | OFF |
| Pattern 2 | OFF | OFF | ON | ON | OFF | OFF | OFF | ON | ON | OFF |
| Pattern 3 | OFF | OFF | ON | ON | ON | OFF | OFF | ON | OFF | ON |

As shown in Table 2, there are three patterns of the signal S1 for the relative positional relationship in the stroke direction. Since the logic circuit shown in FIG. 13 processes the three patterns of the signal S1 by also fetching information for the signals S1 of the adjacent winding groups 4, as the obtained result, only two signals S2 are always set to ON. Therefore, in a case wherein the signal S1 is transmitted, unchanged, to the winding switching devices 8, three or two winding switching devices 8 are closed in accordance with the positional relationship of the stator and the moving element. However, since the above described signal preparation circuits 150 are prepared, only two (a predetermined number of) winding switching device 180 are constantly closed, regardless of the positional relationship of the stator 130 and the moving element 110.

As described above, when the stator of the linear motor is constituted by using winding groups and winding switching devices, extension of a stroke can be provided through power saving, and at a low cost, so that the invention can be applied for a conveying apparatus in a factory.

In addition, since the velocity fluctuation can also be reduced, the invention can also be applied for conveying apparatuses located in apparatuses.

Embodiment 7

A seventh embodiment of the present invention will now be explained based on FIGS. 15 to 18.

Figure 15:
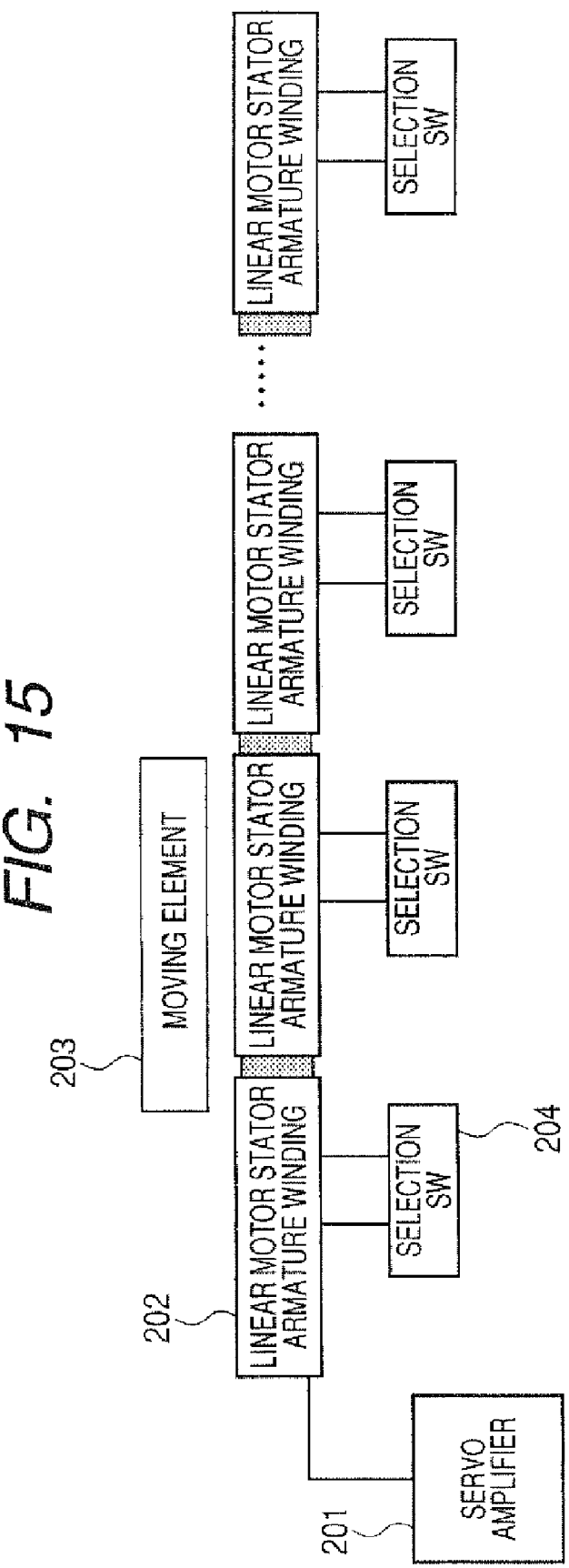
FIG. 15 is a block diagram of a fixed armature type linear motor according to a seventh embodiment of the present invention.

FIG. 15 is a block diagram for a fixed armature type linear motor according to the seventh embodiment of the present invention. In the diagram, the fixed armature type linear motor according to the seventh embodiment of the invention comprises: a servo amplifier 201; stator blocks 202, each of which is formed by winding an armature winding around a linear motor stator; a linear motor moving element 203, which is formed of a permanent magnet or a secondary side conductor; and selection switch portions 204, which change a current to be supplied to the armature windings of the stator blocks 202.

A winding switching method according to the seventh embodiment of this invention will be described in due course.

First, a power line for feeding power to the armature windings of the stator blocks 202 is connected to the servo amplifier 201. The individual armature windings of a plurality of stator blocks 202 are connected in parallel to the servo amplifier 201, and the selection switch portions 204 are respectively connected to the stator blocks 202. Through the selection switch portions 204, power is supplied only the armature windings of a stator block 202 where the moving element 203 of the linear motor is passed through.

Figure 16:
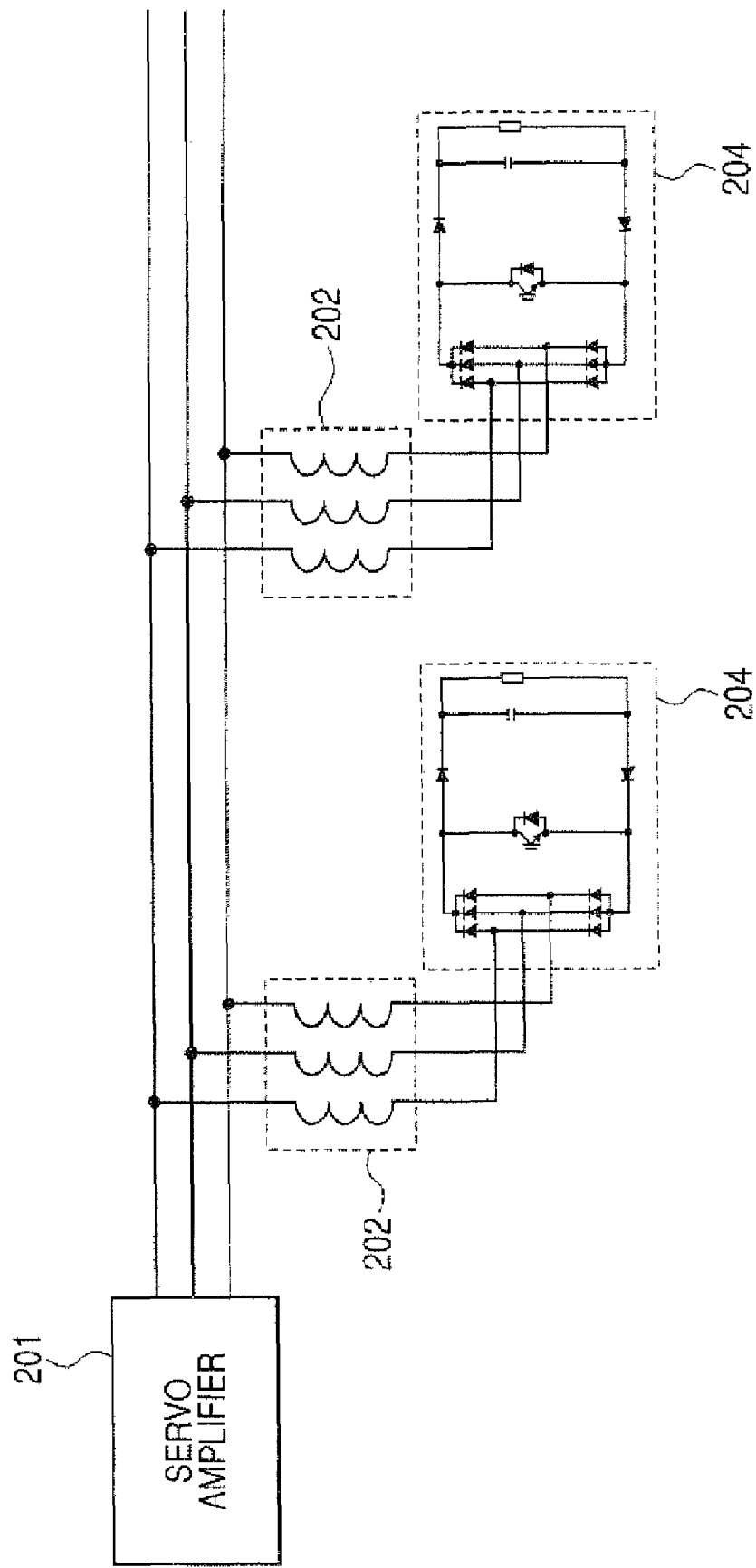
FIG. 16 is a circuit diagram showing an example arrangement for the selection switch portion of a winding switching circuit and a stator block for the seventh embodiment of the present invention.

FIG. 16 is a circuit diagram showing an example arrangement for the selection switch portions 204 of the winding switching circuits and the stator blocks 202 for the seventh embodiment of this invention. For a three-phase armature winding of a stator block 202, ends on one side are connected to the individual phases of the servo amplifier 201, and the ends on the other side are connected to the selection switch portions 204. When this structure is increased in parallel, a long stroke can be obtained.

Figure 17:
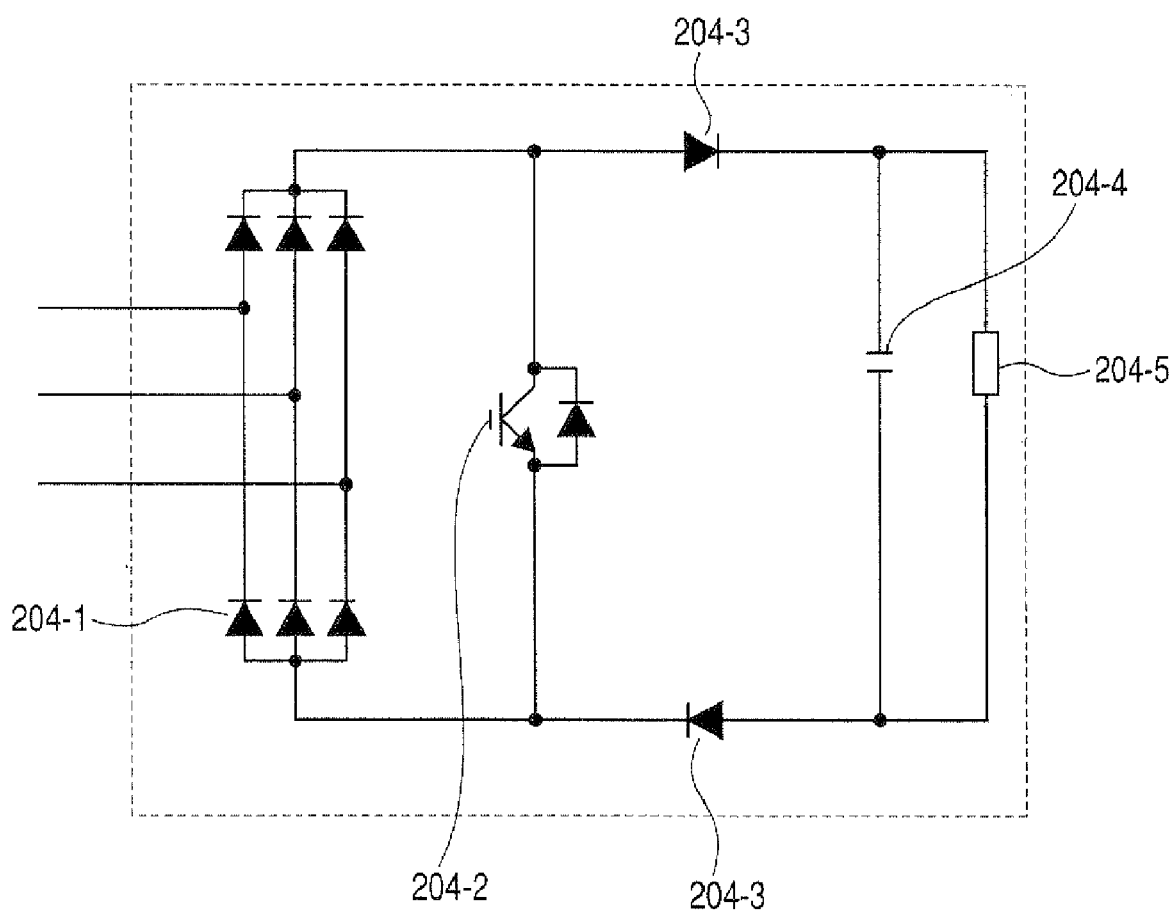
FIG. 17 is a circuit diagram showing an example of an actual arrangement for the selection switch portion according to the seventh embodiment of the present invention.

FIG. 17 is a circuit diagram showing an example for the actual arrangement of the selection switch portion 204 according to the seventh embodiment of this invention. In FIG. 17, reference numeral 204-1 denotes a rectifying diode portion; 204-2, a semiconductor switch device; 204-3, a reflux diode; 204-4, a smoothing capacitor; and 204-5, a discharge resistor. In FIGS. 16 and 17, the ends of the armature windings of the stator block 202, on the side opposite where it is connected to the servo amplifier 201, are connected to the alternating-current input side of the rectifying diode portion 204-1. In a case wherein the semiconductor switch device 204-2 is OFF, the neutral point of the armature winding of the stator block 202 assumes the open state, and the stator block 202 is not excited. When the semiconductor switch 204-2 is ON, the neutral point of the armature winding of the stator block 202 assumes the short-circuit state, and the stator block 202 is excited. Further, when the armature winding of the stator block 202 is changed from the excited state to the non-excited state, the armature winding is suddenly changed from the current-flowing state to the open state. At this time, since energy accumulated in the armature winding must be processed, the energy is absorbed by the smoothing capacitor 204-4, through the rectifying diode 204-1 and the reflux diode 204-3. The energy accumulated in the smoothing capacitor 204-4 is discharged by the discharge resistor 204-5.

It should be noted that, in FIG. 17, reference symbol IGBT (Insulated Gate Bipolar Transistor) is employed to denote the semiconductor switch device 204-2; however, an optimal semiconductor switch device may be employed in accordance with a voltage and a current.

Figure 18:
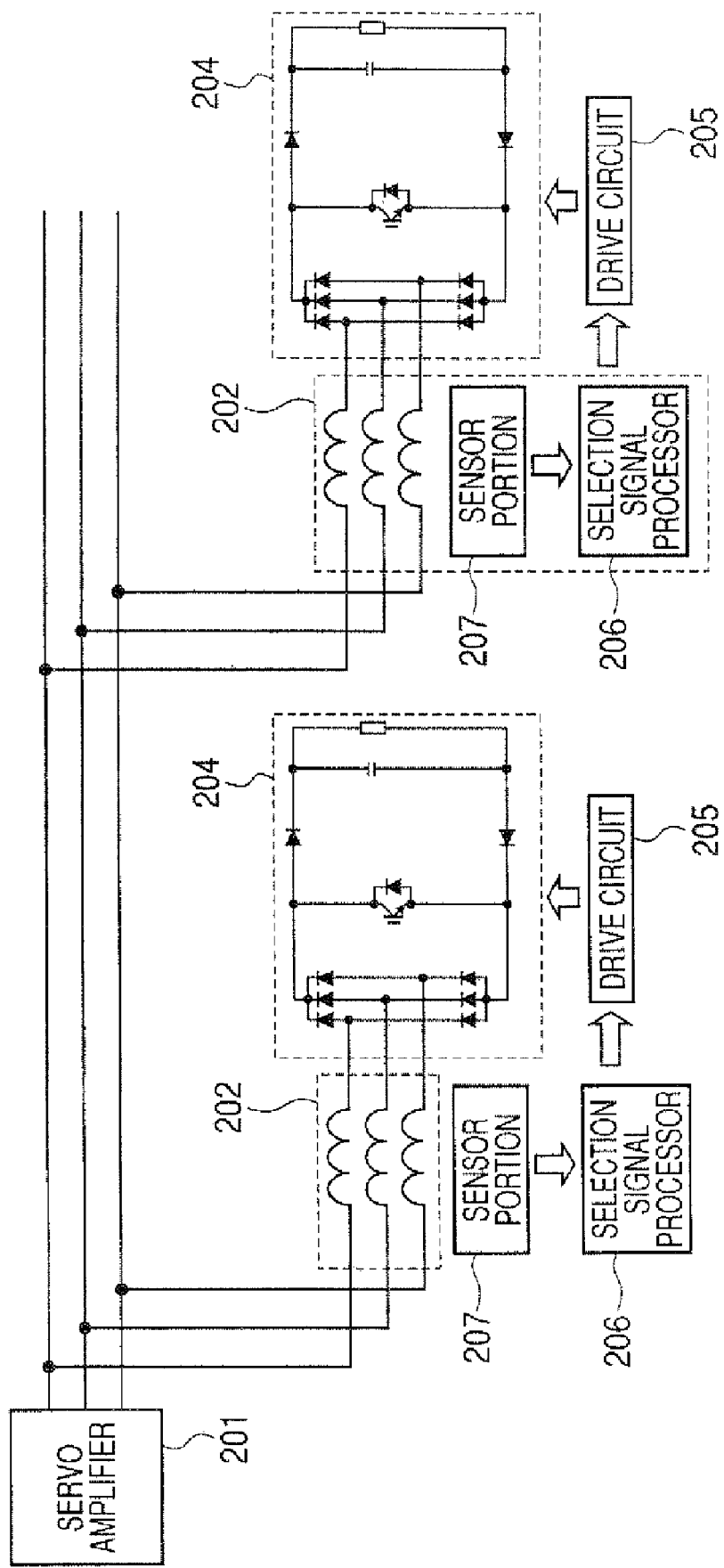
FIG. 18 is a block diagram showing an example of the general arrangement, including the arrangement for the generation of a selection signal to be provided for the selection switch portion, according to the seventh embodiment of the present invention.

FIG. 18 is a block diagram showing an example general configuration, including an example for the generation of a selection signal to be provided for the selection switch portions 204, according to the seventh embodiment of this invention. In FIG. 18, the armature windings of a plurality of stator blocks 202 are connected to the servo amplifier 201, and the selection switch portions 204 are respectively connected to the ends of the armature windings. A drive circuit 205, for turning on or off the semiconductor switch device 204-2, is provided for each selection switch portion 204, and a selection signal processor and a sensor portion 207 for generating a selection signal are arranged. A Hall element, a magnet diode, a magnetic sensor, such as a magneto resistance effect element, or an optical sensor, such as a photosensor, can be employed as the sensor portion 207.

In a state wherein a linear motor moving element 203 (see FIG. 15) is not located at the position of the stator block 202, the sensor portion 207 does not detect anything, so that the selection switch portion 204 remains OFF, the neutral points of the armature windings of the stator block 202 are in the open state, and the stator block 202 is not excited. When the linear motor moving element 203 reaches the position of a stator block 202, the sensor portion 207 detects the arrival of the moving element 203, the selection signal processor 206 processes this signal, and the drive circuit 205 converts the resultant signal into a drive signal, for the selection switch, to turn on the semiconductor switch device 204-2 of the selection switch portion 204. At this time, the neutral points of the armature windings of the stator block 202 enter the short-circuit state, a three-phase current is supplied by the servo amplifier 201 to the armature windings, and the linear motor stator is excited. When a plurality of the structures are connected in parallel to the servo amplifier 201, a fixed armature type linear motor having a long stroke can be provided.

It should be noted that, in the above described embodiment, an example is depicted wherein the selection switch portions 204 are provided in a number equivalent to the plurality of stator blocks 202. However, for example, in a case where a large area is excited, relative to the linear motor moving element 203, one selection switch portion 204 may be employed to turn on/off the armature windings of a plurality of stator blocks at the same time.

The present invention is explained in detail by referring to specific modes. However, it will be obvious to one having ordinary skill in the art that various modifications or alterations can be added without departing from the spirit and the scope of the present invention.

The present invention is based on Japanese Patent Application No. 2004-330362, filed on Nov. 15, 2004, and Japanese Patent Application No. 2004-289677, Oct. 1, 2004, and the contents thereof are included as a reference in this specification.

INDUSTRIAL APPLICABILITY

The present invention is useful, for example, for a linear motor system that easily enables an extension of a stroke at a low cost, without increasing the number of controllers and without velocity fluctuation.

Furthermore, the present invention can be appropriately applied for an inexpensive fixed armature type linear motor having a long stroke, wherein only one servo amplifier can be employed to efficiently and in a moment switch a plurality of armature windings, and wherein the stator side is formed of a linear motor stator and armature windings, and the moving element side is formed of a set of permanent magnets and a secondary conductor.

[FIG. 1]
1: MOVING ELEMENT
2: PERMANENT MAGNET
3: STATOR
4: WINDING GROUP
5: WINDING
6: WINDING SWITCHING DEVICE
7: CONTROLLER
51: WINDING START
52: WINDING END
A1: STROKE DIRECTION

[FIG. 2]
61: THREE-PHASE RECTIFIER
62: SEMICONDUCTOR SWITCH
63: RESISTOR
64: CAPACITOR
A1: INPUT OPEN/CLOSE SIGNAL FOR SEMICONDUCTOR SWITCH
A2: ELECTRICALLY CONNECT TO WINDING ENDS 52 OF WINDINGS OF WINDING GROUP 4

[FIG. 3]
1: MOVING ELEMENT
2: PERMANENT MAGNET
3: STATOR
4: WINDING GROUP
5: WINDING
6: WINDING SWITCHING DEVICE
7: CONTROLLER
8: SENSOR
51: WINDING START
52: WINDING END
A1: STROKE DIRECTION
A2: SIGNAL

[FIG. 4]
1: MOVING ELEMENT
2: PERMANENT MAGNET
3: STATOR
4: WINDING GROUP
5: WINDING
6: WINDING SWITCHING DEVICE
7: CONTROLLER
81, 82: SENSOR
9: SIGNAL PROCESSING CIRCUIT
51: WINDING START
52: WINDING END
A1: STROKE DIRECTION
A2: SIGNAL

[FIG. 5]
1, 11, 12: MOVING ELEMENT
3: STATOR
4: WINDING GROUP
5: WINDING
6: WINDING SWITCHING DEVICE
7: CONTROLLER
10: FIXING PLATE
51: WINDING START
52: WINDING END
81, 82: SENSOR
91: SIGNAL PROCESSING CIRCUIT
A1: STROKE DIRECTION
A2: SIGNAL

[FIG. 6]
4: WINDING GROUP
5: WINDING
13: SUBSTRATE
15: COIL
81, 82: SENSOR

[FIG. 7]
13: SUBSTRATE
14: CONNECTOR
15: COIL
9, 91: SIGNAL PROCESSING CIRCUIT

[FIG. 8]
5: WINDING
13: SUBSTRATE
14: CONNECTOR
51: WINDING START
51: WINDING END
A1: U PHASE
A2: V PHASE
A3: W PHASE

[FIG. 9]
110: MOVING ELEMENT
120: PERMANENT MAGNET

130: STATOR
140, 141: WINDING GROUP
150: SIGNAL PREPARATION CIRCUIT
161: CONNECTOR
171: SENSOR
180: WINDING SWITCHING DEVICE
190: CONTROLLER
A1: STROKE DIRECTION

[FIG. 10]
140: WINDING GROUP
161: CONNECTOR
171: SENSOR
A1: U-PHASE WINDING
A2: V-PHASE WINDING
A3: W-PHASE WINDING

[FIG. 11]
167, 168: CONNECTOR
180: WINDING SWITCHING DEVICE
181: THREE-PHASE RECTIFIER
182: SEMICONDUCTOR SWITCH
183: RESISTOR
184: CAPACITOR
A1: SIGNAL INPUT S2 FOR OPENING/CLOSING A SEMICONDUCTOR SWITCH

[FIG. 12]
150: SIGNAL PREPARATION CIRCUIT

[FIG. 13]
150: SIGNAL PREPARATION CIRCUIT
A1: WINDING GROUP

[FIG. 14]

The invention claimed is:

1. A linear motor system, comprising:
a linear motor, wherein a moving element, which includes magnetic loading member formed of permanent magnets, and a stator, which includes magnetic loading member formed of windings having winding faces opposite the permanent magnets, are positioned opposite each other, separated by a gap, and wherein the stator is formed of a plurality of winding groups separated in a stroke direction, and phase windings of individual phases that form each winding group, to include a winding start terminal and a winding end terminal;
a controller, for supplying a variable voltage having a variable frequency to the linear motor; and
a winding switching device, for closing or opening, as needed, the phase windings for the individual phases that form the plurality of winding groups separated in the stroke direction, wherein
the winding switching device includes;
a three-phase rectifying member,
a semiconductor switch located on both direct-current output sides of the three-phase rectifying member and
a resistor and a capacitor connected in parallel to the semiconductor switch,
one end of each of the phase windings, which form the plurality of winding groups separated in the stroke direction, is connected to an output end of the controller, and the other end is connected to an alternating-current input side of the three-phase rectifying member of the winding switching device, and
the semiconductor switch included in the winding switching device is opened or closed to excite only a desired winding group of the plurality of winding groups separated in the stroke direction.

2. The linear motor system according to claim 1, wherein for the winding groups that form the stator, at least a sensor, for detecting at least one moving element or more that is opposite, is provided in the stroke direction; and
based on a signal from the sensor, the semiconductor switch of the winding switching device connected to a winding group, which is opposite the moving element, is closed.

3. The linear motor system according to claim 1, wherein when Lc denotes a length, in the stroke direction, of a winding group forming the stator, and Lml denotes a length of the moving element, in the stroke direction, determining Lc and Lml in order to establish the relationship $Lml = n \times Lc$ n: an integer of two or greater, and
exciting only a winding group entirely opposite the moving element in the stroke direction.

4. The linear motor system according to claim 1, wherein when Lc denotes a length in the stroke direction of a winding group forming the stator, and Lms denotes a length of the moving element in the stroke direction, arranging, in the stroke direction, a plurality of moving elements for which the relationship $Lms = Lc/n$ n: an integer of two or greater is established,
attaching the moving elements to a fixed plate at a moving element arrangement pitch Lmp to establish the relationship $Lmp = Lms \times (n+1)$, and exciting only winding groups that the moving elements are entirely opposite to in the stroke direction.

5. The linear motor system according to claim 1, wherein the winding groups that serve as the electricity loading member, the detection sensor for detecting the moving element and a processing circuit for processing a sensor from the detection sensor are respectively mounted on substrates on which a pattern is formed; and
a plurality of the substrates are coupled by connectors to form the stator.

6. A linear motor system, comprising:
a linear motor wherein a moving element, which includes magnetic loading member, formed of permanent magnets, and a stator, which includes magnetic loading member formed of windings having winding faces opposite the permanent magnets, are positioned opposite each other, across a gap, wherein the stator is formed of a plurality of winding groups separated in a stroke direction, and phase windings of individual phases, which form each winding group, include a winding start terminal and a winding end terminal, and wherein sensors, for detecting that the moving element is entirely opposite, are respectively provided for the windings in the stroke direction;
a controller for supplying a variable voltage variable frequency; and
a winding switching device that includes;
a three-phase rectifying member,
a semiconductor switch, located on both direct-current output sides of the three-phase rectifying member, and
a resistor and a capacitor, arranged in parallel to the semiconductor switch, wherein
the winding start terminal of each of the phase windings, which form the plurality of winding groups separated in the stroke direction, is connected to an output terminal of the controller, and the other end is connected to an alternating-current input side of the three-phase rectifying member, of the winding switching device, and the semiconductor switch included in the winding switching device is closed, to excite the plurality of winding groups separated in the stroke direction, when Lc denotes a length of each of the winding groups in the stroke direction, and Lm denotes a length of the moving element in the stroke direction, determining Lc and Lm to establish the relationship $$Lm = n \times Lc$$

n: 2 or 3; and providing, for each of the winding groups, a signal preparation circuit that employs a signal from a sensor prepared for a winding group and a signal from a sensor prepared for at least one of the winding groups adjacent to that winding group, and prepares a signal for opening and closing the winding switching device that is connected to the winding groups.

7. The linear motor system according to claim 6, wherein the signal preparation circuits output signals to always set n−1 winding groups in an excited state.

8. The linear motor system according to claim 7, wherein each of the signal preparation circuits is constituted by a logic circuit, for outputting a signal that is obtained by performing an AND process for a signal output by a sensor arranged for a winding group for which the signal preparation circuit is provided, and an inverted signal of a signal output by a sensor arranged for one of winding groups adjacent to the winding group.

9. The linear motor system according to claim 7, wherein each of the signal preparation circuits is constituted by a logical circuit, which employs, as an output signal, the results obtained by performing an AND process for a signal output by a sensor arranged for a winding group for which the signal preparation circuit is provided, and a signal that is obtained by performing an AND process for signals output by two sensors arranged for both winding groups adjacent to the winding group and by inverting the resultant signal.

10. A linear motor system, wherein a plurality of stator blocks, each of which includes a linear motor stator and armature windings having a plurality of phases, are arranged linearly, and wherein an armature element side is constituted by a set of permanent magnets and a secondary conductor, comprising:

a winding switching circuit, wherein one terminal of each of the armature windings in each of the plurality of stator blocks is connected to each phase line of one linear motor driving servo amplifier, and the other terminal of the armature winding is connected to a middle point of a diode bridge having a plurality of phases, a semiconductor switch device is connected between a positive common terminal and a negative common terminal of the diode bridge, a series circuit, formed of a first reflux diode, a discharge resistor and a second reflux diode, is connected in parallel to the semiconductor switch, and a smoothing capacitor is connected in parallel to the discharge resistor, and when the semiconductor switch is sequentially turned on or off, based on a position signal from a moving element position sensor that is arranged on the linear motor stator side, the armature windings having a plurality of phases are switched between an excited state and an unexcited state.

11. The linear motor system according to claim 10, wherein the same number of winding switching circuits as the plurality of stator blocks are provided.

12. The linear motor system according to claim 10, wherein the moving element position sensor generates a drive signal for the semiconductor switch device to sequentially switch the plurality of stator blocks.

* * * * *